(12) United States Patent  (10) Patent No.: US 7,184,222 B2
Nishina  (45) Date of Patent: *Feb. 27, 2007

(54) ORIGINAL READING LENS, ORIGINAL READING LENS UNIT, ORIGINAL READING DEVICE, AND IMAGE FORMING DEVICE

(75) Inventor: Kiichiro Nishina, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/331,286

(22) Filed: Jan. 13, 2006

(65) Prior Publication Data

US 2006/0114577 A1  Jun. 1, 2006

Related U.S. Application Data

(63) Continuation of application No. 10/971,160, filed on Oct. 25, 2004, now Pat. No. 7,027,236.

(30) Foreign Application Priority Data

Oct. 28, 2003  (JP) .............................. 2003-367821

(51) Int. Cl.
*G02B 15/14* (2006.01)
*G02B 9/60* (2006.01)

(52) U.S. Cl. ..................................... 359/688; 359/768
(58) Field of Classification Search ................ 359/688, 359/764, 767, 768

See application file for complete search history.

(56) References Cited

U.S. PATENT DOCUMENTS 4,396,256 A  8/1983  Fujie

2005/0141103 A1* 6/2005 Nishina ...................... 359/715

FOREIGN PATENT DOCUMENTS

| JP | 9-304696 | 11/1997 |
|---|---|---|
| JP | 2729039 | 12/1997 |
| JP | 2790919 | 6/1998 |
| JP | 10-253881 | 9/1998 |
| JP | 11-109221 | 4/1999 |
| JP | 2001-166359 | 6/2001 |

* cited by examiner

*Primary Examiner*—Alicia M Harrington
(74) *Attorney, Agent, or Firm*—Oblon, Spivak, McClelland, Maier & Neustadt, P.C.

(57) ABSTRACT

An original reading lens includes a four-group, five-element lens configuration including three positive lenses and two negative lenses, wherein the positive lens is constructed by a glass material of low dispersion, and the negative lens is constructed by a glass material of high dispersion, a partial dispersion θ gd is defined by θ gd=(ng−nd)/(nF−nc) by a refractive index nd of d line (587.56 nm), a refractive index nc of c line (656.27 nm), a refractive index nF of F line (486.13 nm), and a refractive index ng of g line (435.83 nm), a straight line connecting a coordinate point of a reference glass material K7, K7 (θ gd, ν d) and a coordinate point of a reference glass material F2, F2 (θ gd, ν d) on a plane with a coordinate system including the partial dispersion θ gd and an Abbe number ν d as orthogonal two axes is adopted as a reference line, and a partial dispersion deviation δ θ gd which is the deviation from the reference line of the partial dispersion θ gd of the material is positive in one or more positive lens.

23 Claims, 14 Drawing Sheets

ORIGINAL READING LENS, ORIGINAL READING LENS UNIT, ORIGINAL READING DEVICE, AND IMAGE FORMING DEVICE

This application is a continuation of application Ser. No. 10/971,160, filed on Oct. 25, 2004 now U.S. Pat. No. 7,027,236, which claims priority to JP 2003-367821, filed on Oct. 28, 2003, the entire contents of each of which are incorporated herein by reference.

BACKGROUND OF THE INVENTION

1. Field of the Invention

The present invention relates to an original reading lens, an original reading lens unit, an original reading device, and an image forming device.

2. Related Art Statement

In an image forming device such as a facsimile and digital copier, an original image to be read is reduced by an image reading lens, and is imaged onto a solid-state image sensing device such as a CCD, and then image information is converted into signals. When an image is read by full range of colors, by using a so-called three line CCD in which light-sensitive elements having filters of red, green, and blue, for example, are arranged in three lines in one chip, an original image is imaged on its light sensitive surface, and is separated into three primary colors, and then the color image is converted into signals.

It is necessary for an image reading lens to have high contrast equally from proximity of an optical axis to its periphery in high spatial frequency region area. Accordingly, the field curvature of the image reading lens should be well corrected, and then the field curvature in a sagittal direction should be well corrected and coma flare should be controlled in order to equalize the contrast especially in a sub scanning direction.

In addition, in order to favorably read a color image, it is necessary for an imaging position of each color light such as red, green, and blue to be aligned in the direction of the optical axis on the light sensitive surface of the solid-sate image sensing device. It is also necessary to perform extremely favorable corrections of chromatic aberration and secondary spectrum (axis chromatic aberration of another wavelength when correcting axis chromatic aberration with respect to secondary wavelength) of each color. If the secondary spectrum is not fully corrected, resolution of reading with respect to an image containing large wavelength component of the secondary spectrum is decreased.

It is also required for the image reading lens that the vignetting factor is substantially 100% up to the peripheral part of the field angle.

In other words, in a color image reading lens for preferably reading a color image, curvature of field, axis chromatic aberration, and its secondary spectrum should be well corrected in terms of the aberrations.

In order to favorably correct the filed curvature, it is necessary to reduce Petzval sum as much as possible.

In order to preferably correct the axis chromatic aberration, it is favorable for a positive lens among the lenses constructing a color image reading lens to use a glass material having high refractive index and (large Abbe number) low dispersion and it is preferable for a negative lens among the lenses constructing a color image reading lens to use a material having low refractive index and (small Abbe number) high dispersion.

In order to favorably reduce the secondary spectrum of chromatic aberration, it is preferable for deviation of partial dispersion of each material from a reference line to be positive in a positive lens and to be negative in a negative lens.

However, among optical glasses which are mass-produced and easily obtained, lanthanum crown material and tantalum crown material having high refractive index and low dispersion, which are frequently used as a positive lens, are that the deviation of partial dispersion from a reference line is negative, and heavy flint material having low refractive index and high dispersion, which is frequently used as a negative lens is that the deviation of partial dispersion from a reference line is positive.

Accordingly, in case of using the above easily obtained optical glass, it is extremely difficult to preferably correct axis chromatic aberration while reducing Petzval sum, and also to favorably correct the secondary spectrum of the axis chromatic aberration.

Conventionally, there has been known a color image reading lens using Gauss type of a four-group, six-element lens in which the field curvature is favorably corrected up to about 20° of the half field angle, the generation of coma flare can be controlled even though the aperture is relatively large, and the correction ability of chromatic aberration is high. Such a conventional color image reading lens uses a so-called abnormal dispersion glass in which the deviation of the partial dispersion from the reference line is negative is used for at lease one of the negative third lens and the negative fourth lens for correcting the secondary spectrum of the axis chromatic aberration. (Reference to JP2729039 and JP2790919, JP-A-H09-304696, H10-253881, H11-109221, and 2001-166359.)

However, such a Gauss type is composed of 6 lenses, which is a large number of lenses, so that the outer diameter of the lenses tends to be large, and it is difficult for the color image reading lens to be downsized. Therefore, an image reading device and image forming device tend to be bigger.

The abnormal dispersion glass having about 40 to 45 of Abbe number used for the above negative lens has a processing problem which causes white turbidity (so-called tarnish) on a lens surface by the action of adhesive and cleaning medical agent used for grinding or cleaning. Consequently, because of the tarnish on a lens surface, it is hard to realize high yield, and the processing cost is easy to increase.

Moreover, recycling of processing material is recently requested in various fields of industry with the object of resource saving, and the recycling of the glass material for lens is also intended. Seen from the recycling of the glass material for lens, it is obvious that harmful substance is not contained in the lens material.

SUMMARY OF THE INVENTION

It is, therefore, an object of the present invention to provide a small and low-cost original reading lens which is preferable for reading a full-color image. Even though the original reading lens of the present invention has a four-group, five-element lens configuration in which the number of the lenses is less than the Gauss type of six-element lens configuration, such an original reading lens is constructed such that the F/No is bright about 4.4 to 4.5, the vignetting factor is substantially 100% up to the peripheral part, the curvature of field is well corrected, the coma flare is small, the contrast is high from the vicinity of the axis to the peripheral part in the high spatial frequency region area, the axis chromatic aberration is well corrected and its secondary spectrum is reduced, and the difference of imaging positions of each color light such as red, green, and blue is small.

It is another object of the present invention to provide an original reading lens, which can recycle a glass material of lens and does not cause water pollution by the wastewater of processing.

It is still another object of the present invention to provide an original reading device using the above original reading lens and an image forming device using the original reading device.

In order to achieve the above objects, according to an aspect of the present invention, an original reading lens comprises a four-group, five-element lens configuration including three positive lenses and two negative lenses, and the four-group, five-element lens configuration includes in order from an object side, a first group having a positive first lens, a second group having negative refractive power in which a positive second lens and a negative third lens are cemented, a third group having a negative fourth lens, and a fourth group having a positive fifth lens, and an aperture stop disposed between the second group and the third group, wherein the positive lens is constructed by a glass material of low dispersion, and the negative lens is constructed by a glass material of high dispersion, a partial dispersion θ gd is defined by θ gd=(ng−nd)/(nF−nc) by a refractive index of d line (587.56 nm) nd, a refractive index of c line (656.27 nm) nc, a refractive index of F line (486.13 nm) nF, and a refractive index of g line (435.83 nm) ng, a straight line connecting a coordinate point of a reference glass material K7, K7 (θ gd, ν d) and a coordinate point of a reference glass material F2, F2 (θ gd, ν d) on a plane with a coordinate system including the partial dispersion θ gd and an Abbe number ν d as orthogonal two axes is adopted as a reference line, and a partial dispersion deviation δ θ gd which is the deviation from the reference line of the partial dispersion θ gd of the material is positive in one or more positive lenses.

According to the above original reading lens, the partial dispersion deviation δ θ gd is positive at least in the two lenses of the positive lenses, an average value of the partial dispersion deviation of the three positive lenses δ θ gd (convex) and an average value of the partial dispersion deviation of the two negative lenses δ θ gd (concave) satisfy a following condition, (1) −0.011<δ θ gd (convex) −δ θ gd (concave)<−0.005, and at least one surface of the fourth lens includes an aspherical surface.

According to the above original reading lens, the partial dispersion deviation δ θ gd of the three positive lenses is positive, and the average value of the partial dispersion deviation of the three positive lenses δ θ gd (convex) and the average value of the partial dispersion deviation of the two negative lenses δ θ gd (concave) satisfy a following condition, (1A) −0.011<δ θ gd (convex)−δ θ gd (concave)<−0.007.

According to the above original reading lens, a combined focal length with respect to e line of an entire system f, a focal length with respect to e line of the first group f 1, and a combined focal length with respect to e line of the second group and the third group f 23 satisfy following conditions, (2) 0.77<f1/f<1.28, (3) −0.55<f23/f<−0.45.

According to the above original reading lens, the combined focal length with respect to e line of the entire system f and a distance on an optical axis from the aperture stop to the fourth lens d 6 satisfy a following condition, (4) 0.05<d 6/f<0.09.

According to the above original reading lens, the second lens group in which the second lens and the third lens are cemented is a meniscus shape having a convex surface directed toward the object side, and the fourth lens is a meniscus shape having a convex surface directed toward an image surface.

According to the above original reading lens, the first lens is a meniscus lens having a convex surface directed toward the object side, and the fifth lens is a meniscus lens having a convex surface directed toward the image surface.

According to the above original reading lens, the aspherical surface of the fourth lens comprises a shape that the negative power increases toward the peripheral part.

According to the above original reading lens, the five lenses are all glass lenses, and the glass material of the five lenses does not contain a harmful substance such as lead and arsenic.

According to another aspect of the present invention, an original reading lens unit comprises the above described original reading lens which is integrally incorporated into a lens barrel.

According to a further aspect of the present invention, an original reading device for reading a color image on an original by full range of colors comprises an original supporting device to support the original, an illumination device to illuminate the original supported by the original supporting device, an original reading lens for imaging the image of the illuminated original, a color separation device disposed on an imaging optical path of an original reading lens, and an imaging device to receive the image of original imaged by the original reading lens and convert into an electronic signal, wherein the original reading lens according to any one of claims 1 to 9 is used as the original reading lens.

According to the above original reading device, the original supporting device is a contact glass for planarly placing the original, the illumination device illuminates the original placed on the contact glass in a slit shape and includes a device to scan the original in a direction orthogonal to the slit shaped illuminated portion, and the imaging device is a line sensor.

According to a still further aspect of the present invention, an image forming device for forming an image by writing an image corresponding to an image signal comprises the above described original reading device as a device to convert the image into a signal by reading the original image with full range of colors.

According to the above image forming device, the writing of the image corresponding to the image signal is carried out by an optical writing.

According to the above image forming device, an electrostatic latent image corresponding to an image to be formed is formed onto a photoconductive photoconductor by the optical writing.

BRIEF DESCRIPTION OF THE PREFERRED EMBODIMENTS

Figure 13:
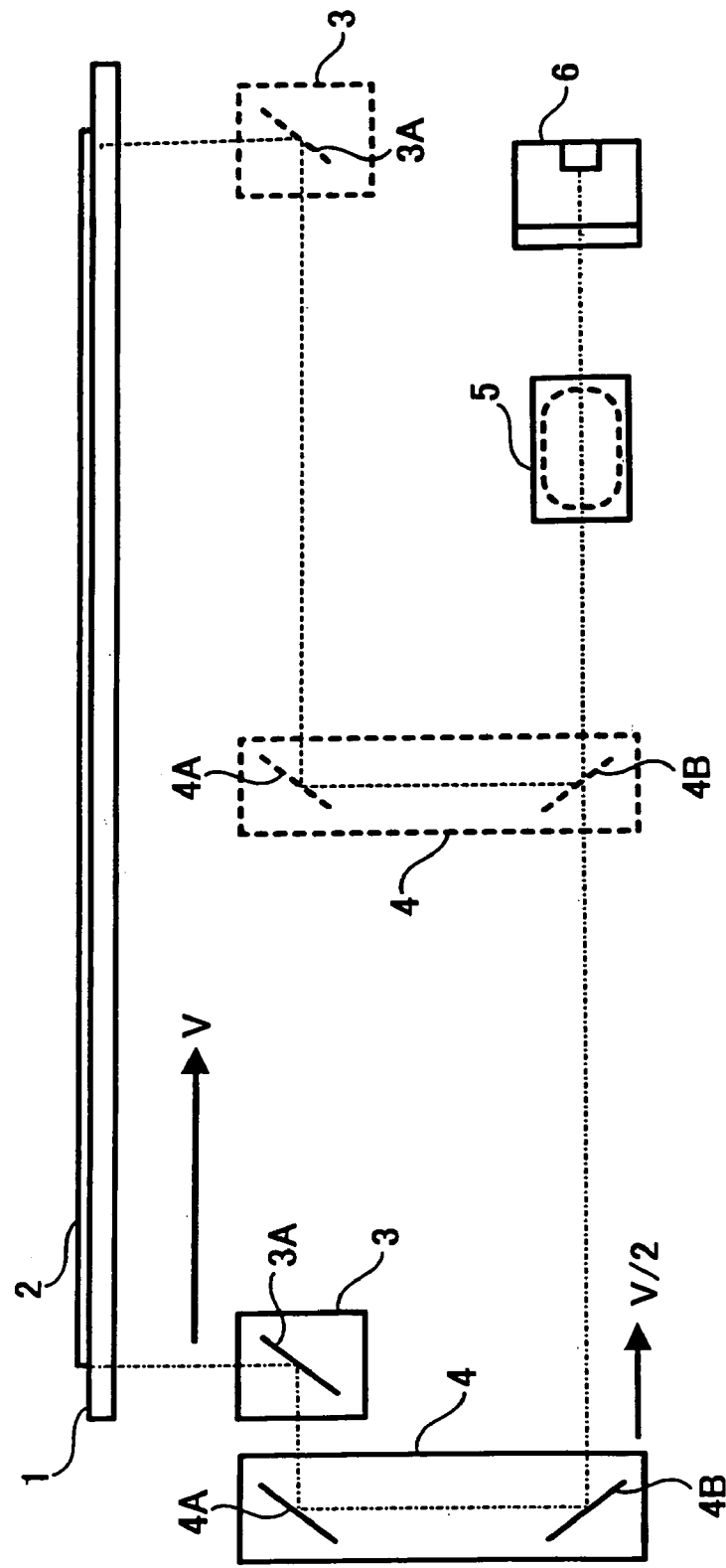
FIG. 13 is a view describing one embodiment of an original reading device.

FIG. 13 illustrates only substantial parts of one embodiment of an original reading device. In FIG. 13, an original 2 to be read is planarly placed on a contact glass 1 as an original supporting device, a long slit shaped portion in the direction orthogonal to the Fig is illuminated by an illumination optical system (not shown) disposed in the lower part of the contact glass 1.

After the light reflected from the illuminated portion of the original 2 is reflected by a first mirror 3A disposed in a first running body 3, the reflected light is sequentially reflected by a second mirror 4A and a third mirror 4B disposed in a second running body 4. The light reflected from the third mirror 4B penetrates an original reading lens (or color image reading lens) incorporated into a lens barrel of an original reading lens unit 5 (or color image reading lens unit), and is imaged as the reduced original image on a light sensitive portion of a line sensor 6 as an imaging device.

An original reading lens according to the after-mentioned any one of claims 1 to 9, in particular, any one of the embodiments 1 to 6 is used as the original reading lens of the present invention.

The first and second running bodies 3, 4 respectively run in the directions shown by the arrows (right direction in the Fig) by a driving device (not shown). The running speed of the first running body 3 is V, and the running speed of the second running body 4 is V/2. By the running of the first and second running bodies 3, 4, the first and second running bodies 3, 4 are respectively displaced toward the positions shown by the dotted lines.

The illumination optical system (not shown) integrally moves with the first running body 3, and illuminates and scans the entire original 2 on the contact glass 1. Since the movement speed ratio between the first running body 3 and the second running body 4 is V:V/2, the optical path length from the original portion to be illuminated and scanned to the original reading lens remains unchanged.

The line sensor 6 is so-called a three line CCD (line sensor of three lines) in which light sensitive elements having red, green, and blue filters as a color separation device are arranged in three lines in one chip, and converts an original image into image signals in accordance with the illumination and scanning of the original 2. The reading of the original 2 is thus performed, and the color image of the original 2 is separated into three primary colors such as red, green, and blue, and then the separated color image is red.

In other words, the original reading device (or color image reading device) shown in FIG. 13 is for reading the color image on the original by full range of colors. The original reading device comprises an original supporting device 1 for supporting the original 2, an illumination device (having the illumination optical system (not shown)), the first and second running bodies 3, 4, the first to the third mirrors 3A, 4A, 4B supported by the running bodies, the driving device (not shown) for driving the above running bodies) for illuminating the original 2 supported by the original supporting device 1, the original reading lens (incorporated into the lens barrel of the original reading lens unit 5) for imaging the image of the illuminated original 2, the color separation device (the red, green, and blue filters disposed in the three line CCD) provided in the imaging optical path of the original reading lens unit 5, and an imaging device 6 for receiving the image of the original imaged by the original reading lens, and then converting into electronic signals. The original reading device shown in FIG. 13 uses the original reading lens according to any one of claims 1 to 9 as the original reading lens. (Claim 18)

The original supporting device is the contact glass 1 for planarly placing the original 2. The illumination device illuminates the original 2 placed on the contact glass 1 in slit shape, and comprises a device for scanning the original in the direction interact with the slit shaped illuminated portion. The imaging device is the line sensor 6. (Claim 19)

In the above original reading device described in claim 19, the original planarly placed onto the contact glass is illuminated and scanned by the illumination device, however the above original reading device described in claim 18 may be constructed to fix the positions among the illumination device, the original reading lens, and the line sensor, and to illuminate and scan the original by moving the original in the direction orthogonal to the slit shaped illuminated portion while illuminating the original to be read by placing onto the contact glass placed onto the position conjugated with the line sensor. In this case, the contact glass is required to have a width such as narrow contact glass necessary for illuminating the original.

In the above described original reading device described in claim 18, it is also possible to construct the device such that the original to be red is planarly placed onto the original glass, the entire plane of the original is illuminated by a predetermined illumination distribution, and the entire plane of the original is simultaneously read by imaging the reduced image of the entire plane of the original onto the light sensitive of the area sensor with the original reading lens. In addition, it is also possible to use a device, which can quickly switch the illumination light of the original in order of red, green, and blue, as the color separation device.

As another embodiment of the original reading device, there can be the original reading device to read and scan an original by running an original reading unit, which mutually integrates an illumination device to illuminate an original on a contact glass in slit shape, a line sensor, a plurality of mirrors for forming an imaging optical path from the non-illuminated portion of the original to the line sensor, and an original reading lens disposed on the imaging optical path, with respect to the original with a driving device.

Moreover, by disposing the original reading lens in a document feeder (so-called ADF), the original reading lens can be used for reading a backside of an original when the both sides of the original are read.

In addition to the above descried color separation, a method for separating color into three colors such as R (red), G (green), and B (blue) by selectively inserting a color separation prism or filter between the original reading lens and the line sensor (CCD), and a method for illuminating the original by sequentially glowing the light sources of R, G, B can be used as a color separation.

Figure 14:
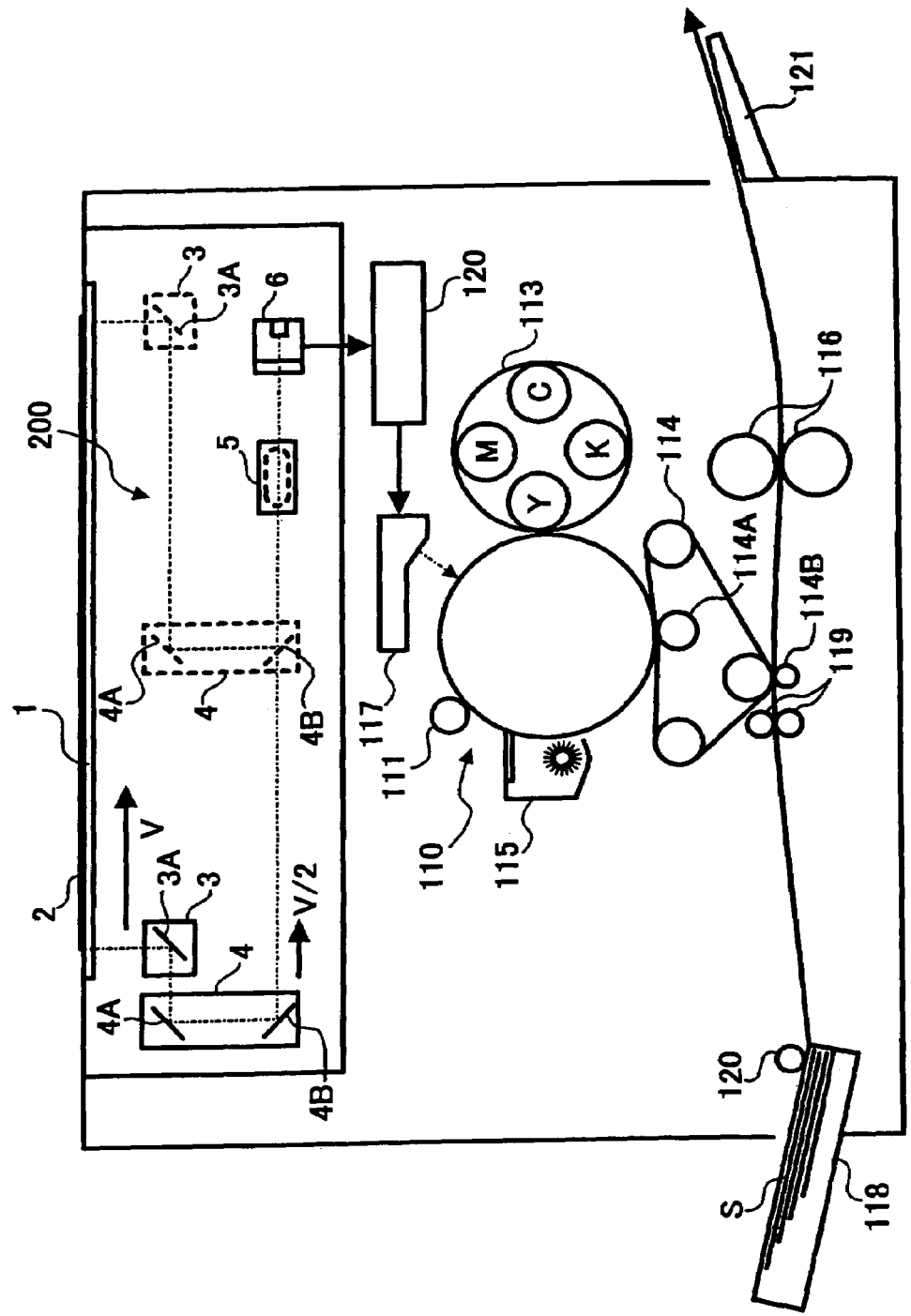
FIG. 14 is a view describing one embodiment of an image forming device.

FIG. 14 shows one embodiment of an image forming device. The image forming device comprises an original reading device 200 (or color image reading device) placed in the upper part of the image forming device and an image forming section placed below the original reading device 200. The portions of the original reading lens 200 are the same as the portions described in FIG. 13, and the same reference characters with FIG. 13 are applied to each portion.

The image signal output from the line sensor of three lines (imaging device) 6 in the original reading device 200 is sent to a signal processing section 120, and is converted into a signal for writing (signal for writing each color of yellow, magenta, cyan, and black) by processing in the signal processing section 120.

The image forming section comprises a photoconductive photoconductor 110 cylindrically formed as a latent image carrier. In the image forming section, an electrification roller 111 as an electrification device, a revolver typed development device 113, a transfer belt 114, and a cleaning device 115 are arranged therearound. As the electrification device, a corona charger can be used instead of using the electrification roller 111.

An optical scanning device 117 for writing in the photoconductor 110 by optical scanning after receiving the signal for writing from the signal processing section 120 is configured to optically scan the photoconductor 110 between the electrification roller 111 and the development device 113.

Reference character 116 denotes a fixing device, reference character 118 a cassette, reference character 119 a pair of resist rollers, reference character 120 a paper feeding roller, reference character 121 a tray, and a reference character S a transfer paper as a recording media.

When an image is formed, the photoconductive photoconductor 110 rotates in the clockwise direction by a constant speed, and the surface thereon is equally charged by the electrification roller 111, and then an electrostatic latent image is formed by receiving the exposure by the optical writing of laser beam of the optical scanning device 117. The formed electrostatic latent image is so-called a negative latent image on which the image portion is exposed.

The image writing is carried out in order of a yellow image, magenta image, cyan image, and black image in accordance with the rotation of the photoconductor 110. The formed electrostatic latent images are reversely developed by each development unit of the revolver typed development device 113 in order of Y (development by yellow toner), M (development by magenta toner), C (development by cyan toner), and K (development by black toner), and then are visualized as positive images. The obtained each color toner image is sequentially transferred onto the transfer belt 114 by a transfer voltage applying roller 114A, and the above toner image of each color is overlapped each other on the transfer belt 114 to be a color image.

The cassette 118 containing the transfer paper S is detachably attached to the body of the image forming device, and with the state mounted as shown in Fig, the uppermost sheet of the housed transfer paper S is fed by the paper feeding roller 120, and the leading end portion of the fed transfer paper S is captured by the pair of resist rollers 119.

The pair of resist rollers 119 feeds the transfer paper S to the transfer section in timing with the color image by the toner on the transfer belt 114 moves to the transfer position. The fed transfer paper S is overlapped with the color image in the transfer section, and the color image is electrostatically transferred by the operation of a transfer voltage applying roller 114B.

The transfer paper S on which the color image is transferred is fixed to the fixing device 116. The color image is fixed in the fixing device 116, and goes through a transport path by a guide device (not shown), and then is discharged on the tray 121 by a pair of discharging rollers (not shown). Every time when the toner image of each color is transferred, the surface of the photoconductor 110 is cleaned by the cleaning device 115, and remained toner, paper powder, and the like are eliminated.

The image forming device illustrating the embodiment in FIG. 14 is for forming an image by writing an image corresponding to an image signal, and comprises the original reading device 200 according to claim 18 or claim 19 as a device for converting an original image into an image signal by reading the original image with the full range of colors (Claim 20). In this image forming device, the writing of the image signal is carried out by the known various methods such as an ink-jet method, ink ribbon method, and thermal method, and the image writing corresponding to an image signal is performed by optical writing (Claim 21). In this case, the writing by the optical writing can be carried out with respect to a silver salt film, but an electrostatic latent image corresponding to the image to be formed is formed on the photoconductive photoconductor 110 by the optical writing (Claim 21).

Figure 1:
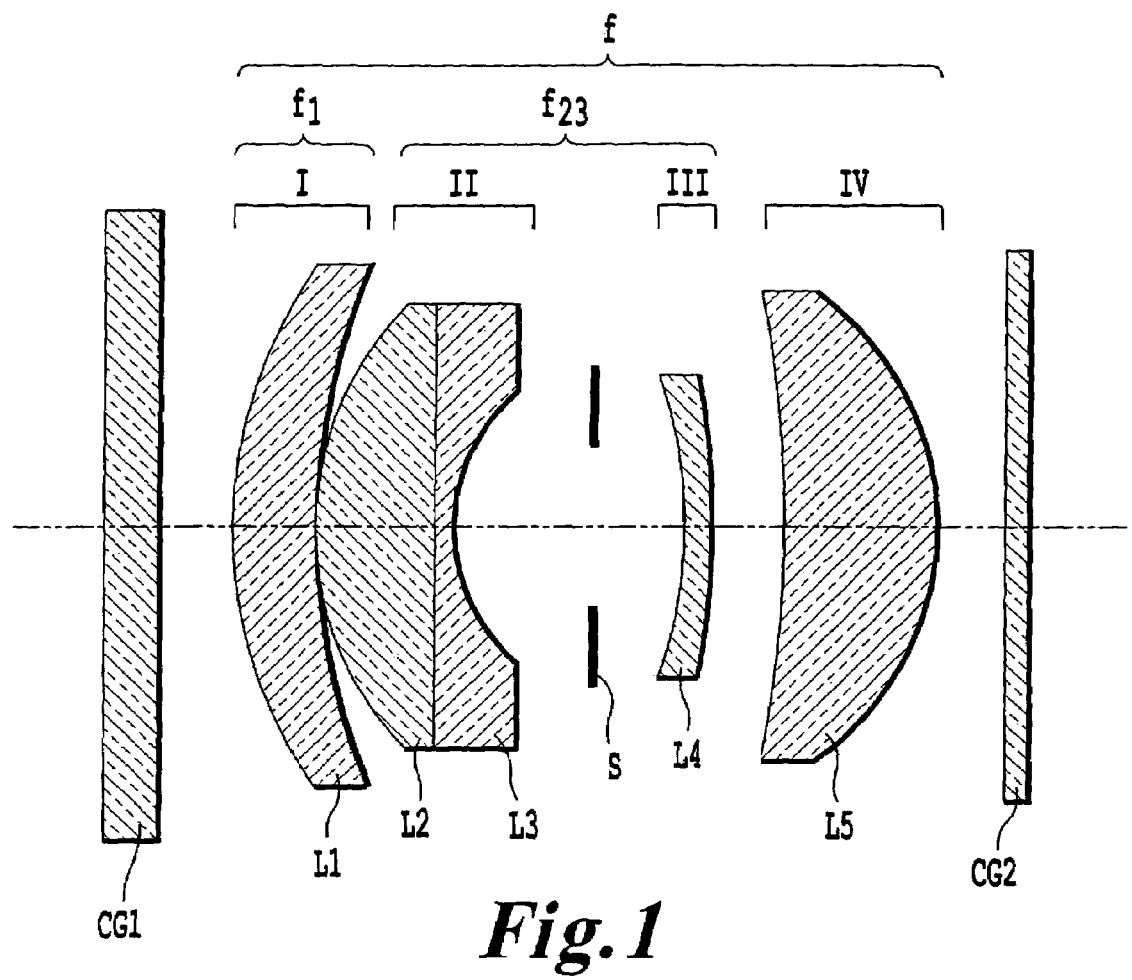
FIG. 1 is a view illustrating the lens construction of the first embodiment.

As illustrated in FIG. 1, the original reading lens of the present invention comprises, in order from an object side (original side to be read, left side of the Fig) to an image side, a fist group I, second group II, third group III, and fourth group IV, and an aperture stop S is disposed between the second group II and the third group III.

The first group I is a positive first lens L1, and the second group II having negative refractive power is a cemented lens in which a negative third lens L3 is cemented to the image side of a positive second lens L2. The third group III is a negative fourth lens L4, and the fourth group IV is a positive fifth lens L5. Accordingly, the original reading lens of the present invention is constructed by the three positive lenses (L1, L2, L5) and the two negative lenses (L3, L4).

Moreover, in FIG. 1, reference character CG1 denotes a contact glass for disposing an original to be read, and reference character CG2 denotes a cover glass of a solid-state image sensing device.

The original reading lens described in claim 1 comprises the following features.

The above three positive lenses (L1, L2, L5) are composed of glass materials of low dispersion, and the above two negative lenses (L3, L4) are composed of glass materials of high dispersion. In one positive lens or more, the partial dispersion deviation $\delta\theta gd$ which is the deviation from the reference line of the partial dispersion $\theta gd$ of the material is positive.

The partial dispersion $\theta gd$ is defined by $\theta gd=(ng-nd)/(nF-nc)$ by the refractive index of d line (587.56 nm) nd, the refractive index of c line (656.27 nm) nc, the refractive index of F line (486.13 nm) nF, and the refractive index of g line (435.83 nm) ng.

The reference line is defined as the straight line connecting the coordinate point of the reference glass material K7, K7 ($\theta gd$, $\nu d$) and the coordinate point of the reference glass material F2, F2 ($\theta gd$, $\nu d$) in the plane with a coordinate system having the partial dispersion $\theta gd$ and Abbe number $\nu d$ as the orthogonal two axes (each point in this plane with a coordinate system is decided by the coordinate, ($\theta gd$, $\nu d$)).

As described above, the positive partial dispersion deviation $\delta\theta gd$ means that the coordinate point on the above plane with a coordinate system of the partial dispersion $\theta gd$ of the glass material positions in the area where the partial dispersion $\theta gd$ increases from the reference line.

Such a glass material of which the partial dispersion deviation δ θ gd is positive has low dispersion. By using such a glass material for the positive lens, favorable correction of axis chromatic aberration can be achieved, and also favorable correction of the secondary spectrum of the axis chromatic aberration can be achieved by the positive partial dispersion deviation. Moreover, such a glass material is superior in the resistance property with respect to abrasive, medical agent for cleaning, and the like and the above mentioned tarnish hardly generate. However, the materials of lanthanum crown and tantalum crown, which are frequently used for a positive lens, have higher refractive index than the glass material in terms of the refractive index.

Consequently, if the glass material having the positive partial dispersion deviation δ θ gd is used for the positive lens, the refractive index n in Petzval sum ($=\Sigma(1/nf)$) becomes small, and works on increasing Petzval sum. Such a glass material is disadvantageous for the planarization of image (correction of field curvature) of the original reading lens, but such a problem can be resolved by using the above lanthanum crown material and tantalum crown material having high refractive index as another positive lens.

In the original reading lens described in claim 1, it is possible for at least two lenses of the three positive lenses to use the lens of which the partial dispersion deviation δ θ gd is positive. In this case, the average value of the partial dispersion deviation of the three positive lenses δ θ gd (convex) and the average value of the partial dispersion deviation of the two negative lenses δ θ gd (concave) satisfy the following condition, (1) −0.011<δ θ gd (convex)−δ θ gd (concave)<−0.005, and it is preferable for at least one surface of the fourth lens to include an aspherical surface (Claim 2).

As stated above, if the lens having the positive partial dispersion deviation δ θ gd is used for more than one lens in the three positive lenses, the correction of the axis chromatic aberration and its secondary spectrum can be more preferably performed. However, it is disadvantageous for the correction of the field curvature because of the increase in Petzval sum. Such deterioration of the field curvature resulting from the increase in Petzval sum can be controlled by adopting an aspherical surface. The field curvature can be easily and definitely corrected by adopting the aspherical surface onto the fourth group which is the closest to the image surface.

When the average value shown in the condition (1) exceeds the higher limit of the condition (1), the secondary spectrum tends to be large in negative in the wavelength range between the two wavelengths correcting the axis chromatic aberration. On the contrary, when the average value shown in the condition (1) exceeds the lower limit of the condition (1), the correction of the secondary spectrum becomes insufficient, and the secondary spectrum tends to be large in positive in the wavelength area of the outside of the above two wavelengths.

The condition (1) means for conducting appropriate selections for the materials of the positive lens and the negative lens. The condition (1) also means for selecting the material of the two negative lenses such that the average value of the partial dispersion deviation δ θ gd (concave) of the two negative lenses becomes larger than 0.005 compared with the average value of the partial dispersion deviation δ θ gd (convex) of the three positive lenses when the positive partial dispersion deviation δ θ gd is used for more than one positive lens. The above mentioned heavy flint material having low refractive index and high dispersion (positive partial dispersion deviation) can be used as the material of such negative lenses.

In the original reading lens described in claim 2, the axis chromatic aberration and its secondary spectrum can be more favorably corrected by adopting the positive partial dispersion deviation δ θ gd of the material of the three positive lenses. In this case, it is favorable for the average value of the partial dispersion deviation of the three positive lenses δ θ gd (convex) and the average value of the partial dispersion deviation of the two negative lenses δ θ gd (concave) to satisfy the condition (1A) −0.011<δ θ gd (convex)−δ θ gd (concave)<−0.007, which is narrower than the above condition (1) (Claim 3).

When the average value shown in the condition (1A) exceeds the higher limit of the condition (1A), the compensation of the partial dispersion deviation by the negative lens becomes insufficient, and the secondary spectrum becomes too large in negative in the wavelength area between the two wavelengths correcting the axis chromatic aberration. On the contrary, when the average value shown in the condition (1A) exceeds the lower limit of the condition (1A), the partial dispersion deviation by the negative lens is over compensated, and the correction of the secondary spectrum becomes insufficient and then the secondary spectrum becomes large in positive in the wavelength area of the outside of the above two wavelengths.

In the original reading lens described in any one of claims 1 to 3, it is preferable for the combined focal length with respect to e line of the entire system f, the focal length with respect to e line of the first lens group f1, and the combined focal length with respect to e line of the second and third lens groups f 23 to satisfy the following conditions, $$0.77 < f1/f < 1.28. \quad (2)$$

$$-0.55 < f\,23/f < -0.45 \text{ (Claims 4 to 6).} \quad (3)$$

In the original reading lens described in any one of claims 1 to 6, it is favorable for the combined focal length with respect to e line of the entire system f and the distance on the optical axis from the aperture stop to the fourth lens d 6 to satisfy the condition (4) 0.05<d 6/f<0.09 (Claims 7 to 12).

The aberrations can be more preferably corrected by satisfying the conditions (2), (3). In other word, the condition (2) is for defining the power of the first lens group. When f 1/f shown in the condition (2) exceeds the higher limit of the condition (2), the power of the first lens group becomes too weak. Therefore, it becomes necessary for the entire lens to be larger for securing the lens performance, and then it becomes difficult for the lens to be downsized and to lower the cost. Moreover, when f 1/f shown in the condition (2) exceeds the lower limit of the condition (2), the power of the first lens group becomes too strong. It is advantageous for downsizing the original reading lens, but the coma flare increases, so the contrast is easy to decrease especially in the low spatial frequency.

The condition (3) is for defining the combined power of the second and third groups having negative power. When f 23/f shown in the condition (3) exceeds the higher limit of the condition (3), the spherical aberration and the field curvature are over corrected, resulting in the deterioration of the coma aberration in the peripheral part. On the contrary, when f 23/f shown in the condition (3) exceeds the lower limit of the condition (3), the corrections of the spherical aberration and the field curvature tend to be insufficient, and the coma aberration in the intermediate field angle tends to deteriorate by the increase of the astigmatism in the intermediate field angle. Accordingly, it becomes difficult to achieve favorable imaging performance through the entire plane.

The above condition (4) is for defining the interval between the fourth lens having the aspherical surface and the aperture stop. When d 6/f shown in the condition (4) exceeds the higher limit of the condition (4), the fourth lens distances from the aperture stop, so that the lens diameter of the fourth lens increases and the size of the fourth lens becomes large. Accordingly, the material cost and the processing cost for forming the ashperical surface of the fourth lens are raised. On the contrary, when d 6/f shown in the condition (4) exceeds the lower limit of the condition (4), the fourth lens gets closer to the aperture stop, so that the angle of the off-axis luminous flux entering onto the fourth lens becomes sharp, and the coma flare and the field curvature are easy to be increased since the luminous flux on the axis and the off-axis luminous flux are not separated on the lens surface of the fourth lens. Therefore, it becomes difficult to achieve high performance.

In the original reading lens according to claim 1, it is preferable for the second group after the second lens and the third lens have been cemented to be a meniscus lens having a convex surface directed onto the object side and for the fourth lens to be a meniscus lens having a concave surface directed onto the image surface (Claim 13). As stated above, by adopting the meniscus lenses for the lenses (the second and third lens groups) near the aperture stop, the luminous ray concentrically enters as much as possible with respect to the aperture stop disposed between the second group and the third group. Accordingly, the spherical aberration and the field curvature can be easily reduced.

In the original reading lens described in claim 13, it is favorable for the first lens to be a meniscus lens having a convex surface directed onto the object side and for the fifth lens to be a meniscus lens having a convex surface directed onto the image surface (Claim 14).

In the lens construction of claim 14, all the lenses are the meniscus lenses, the luminous ray can concentrically enters as much as possible by the all lenses with respect to the aperture stop disposed between the second group and the third group. Such a lens construction maintains symmetry property with respect to the aperture stop, and can reduce the spherical aberration, distortion, and chromatic aberration of magnification.

It is preferable for the aspherical surface in the fourth lens (meniscus lens having the convex surface directed onto the image surface) in the original reading lens according to claim 13 to be formed that the negative power is increased toward the peripheral part (Claim 15).

In the original reading lens of the present invention, in order to correct the secondary spectrum of the axis chromatic aberration, the material having the positive partial dispersion deviation $\delta \theta$ gd is used for at least one or more positive lens. As described above, in the optical glass which is presently mass-produced, the refractive index of the material having the positive partial dispersion deviation and low dispersion is generally small. Therefore, when such a material is used, the Petzval sum tends to increase, and it is disadvantageous for the correction of the filed curvature. In order to avoid such a disadvantage, it is preferable for the aspherical surface which is adopted at least one surface of the negative fourth lens to be formed that the negative power is increased toward the peripheral part with respect to the vicinity of the optical axis.

In particular, when the aspherical surface is adopted for the first surface (surface of object side) of the meniscus fourth lens, the first surface is adopted to be that the radius curvature decreases toward the peripheral part since the first surface has the negative power. When the aspherical surface is adopted for the second surface (surface of image surface, the second surface is adopted to be that the radius curvature increases toward the peripheral part since the second surface has the positive power. Accordingly, the field curvature can be favorably corrected.

In the original reading lens described in claim 1, all the five lenses are adopted to be the glass lenses, and it is preferable that the glass material of the lenses does not contain the harmful substances such as lead and arsenic (Claim 16).

As stated above, if the five lenses are constructed by the optical glass which is chemically stabilized and does not contain the harmful substances such as lead and arsenic, the material can be recycled, and the material does not cause the water pollution by the wastewater at the time of processing. Moreover, by reducing the conventional six lens structure to the five lens structure, it is possible to save resources and to reduce $CO_2$ and the like generated at the time of processing. Accordingly, the environmentally-friendly original reading lens, which is small and low cost, can be obtained.

The original reading lens unit of the present invention is constructed that the original reading lens described in any one of claim 1 is integrally incorporated into the lens barrel (Claim 17).

Hereinafter, specific six embodiments of original reading lenses (or color image reading lenses) are described. Reference characters of each embodiment mean as follows.

f is combined focal length with respect to e line of the entire system.

F No is F number.

m is magnification.

$\omega$ is half field angle.

Y is object height.

r i (i=1 to 11) is the curvature radius of ith surface (including the aperture stop surface) from the object side.

n j (j=1 to 5) is the refractive index of the material of jth lens from the object side.

$\nu$ j(j=1 to 5) is Abbe number of the material of jth lens from the object side.

r c 1 is the curvature radius of object side of the contact glass.

r c 2 is the curvature radius of image side of the contact glass.

r c 3 is the curvature radius of object side of the cover glass of CCD (line sensor).

r c 4 is the curvature radius of image side of the cover glass of CCD.

d c 1 is the thickness of the contact glass.

d c 3 is the thickness of the cover glass of CCD.

n c 1 is the refractive index of the cover glass of CCD.

n c 3 is the refractive index of the contact glass.

$\nu$ c 1 is Abbe number of the contact glass.

$\nu$ c 3 is Abbe number of the cover glass of CCD.

n d is the refractive index of d line (587.56 nm).

n e is the refractive index of e line (546.07 nm).

n g is the refractive index of g line (435.83 nm).

n F is the refractive index of F line (486.13 nm).

n C is the refractive index of C line (656.27 nm).

$\delta \theta$ gd j (j=1 to 5) is the partial dispersion deviation of the material of ith lens from the object side $\delta \theta$ gd (convex) is the average of partial dispersion deviation of the lenses having positive refractive power.

$\delta \theta$ gd (concave) is the average of partial dispersion deviation of the lenses having negative refractive power.

An aspherical surface is expressed by the following formula.

$$X = (1/R)Y^2 / [1 + \sqrt{(1-(1+K)(Y/R)^2)}] + A4 \times Y^4 + A6 \times Y^6 + A8 \times Y^8 + A10 \times Y^{10}$$

Where, Y is the height from the optical axis. X is the height from the optical axis, distance from the tangential plane in the apex of the aspherical surface, aspherical surface in Y. R is the paraxial curvature radius of the aspherical surface. K is the cone multiplier. A4, A6, A8, A10 are the aspherical surface coefficients. In the data notation, E-XY means $10^{-XY}$. Through the embodiments 1 to 6, the sixth surface from the object side of the original reading lens is the surface of an aperture stop.

(Embodiment 1)

f=84.285, F=4.95, m=0.23622, Y=152.4, ω=19.1°

The data of the first embodiment is shown in Table 1. O shown in the material name box represents the name of the producer, OHARA, and H represents HOYA.

TABLE 1

| | R | D | Nd | vd | ne | Ng | NF | nC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ | | | | | | | | |
| 1 | 29.667 | 5.777 | 1.71300 | 53.94 | 1.71615 | 1.72939 | 1.72220 | 1.70898 | LAC8 (H) |
| 2 | 58.075 | 0.100 | | | | | | | |
| 3 | 23.951 | 7.719 | 1.72342 | 37.99 | 1.72793 | 1.74793 | 1.73685 | 1.71781 | BAFD8 (H) |
| 4 | 3743.417 | 1.500 | 1.67270 | 32.17 | 1.67764 | 1.69999 | 1.68752 | 1.66661 | EFD5 (H) |
| 5 | 12.917 | 8.853 | | | | | | | |
| 6 | ∞ | 5.980 | | | | | | | |
| 7 | −29.479 | 1.500 | 1.68893 | 31.16 | 1.69416 | 1.71786 | 1.70462 | 1.68251 | EFD8 (H) |
| 8 | −55.585 | 5.280 | | | | | | | |
| 9 | −128.284 | 10.000 | 1.48749 | 70.44 | 1.48914 | 1.49594 | 1.49227 | 1.48535 | FC5 (H) |
| 10 | −19.790 | | | | | | | | |
| C3 | ∞ | 1.000 | 1.51633 | 64.1 | 1.51825 | 1.52621 | 1.52191 | 1.51386 | SBSL7 (O) |
| C4 | ∞ | | | | | | | | |

Table 2 represents the aspherical coefficients.

TABLE 2

| Plain number | K | A4 | A6 | A8 | A10 |
|---|---|---|---|---|---|
| 8 | −8.35253 | 5.89609E−06 | 1.95474E−08 | −4.66956E−11 | 1.51034E−13 |

Table 3 represents δ θ gfi (i=1 to 5) of the partial dispersion deviation of each lens and parameter value of condition (1).

TABLE 3

| Δ θ gd 1 | δ θ gd 2 | δ θ gd 3 | δ θ gd 4 | Δ θ gd 5 | δ θ gd(⌐) | δ θ gd(⌐) | δ θ gd(⌐) − δ θ gd(⌐) |
|---|---|---|---|---|---|---|---|
| −0.00942 | 0.00190 | 0.00652 | 0.00757 | 0.00933 | 0.00060 | 0.00704 | −0.00644 |

FIG. 1 illustrates the lens construction of the first embodiment.

Figure 2:
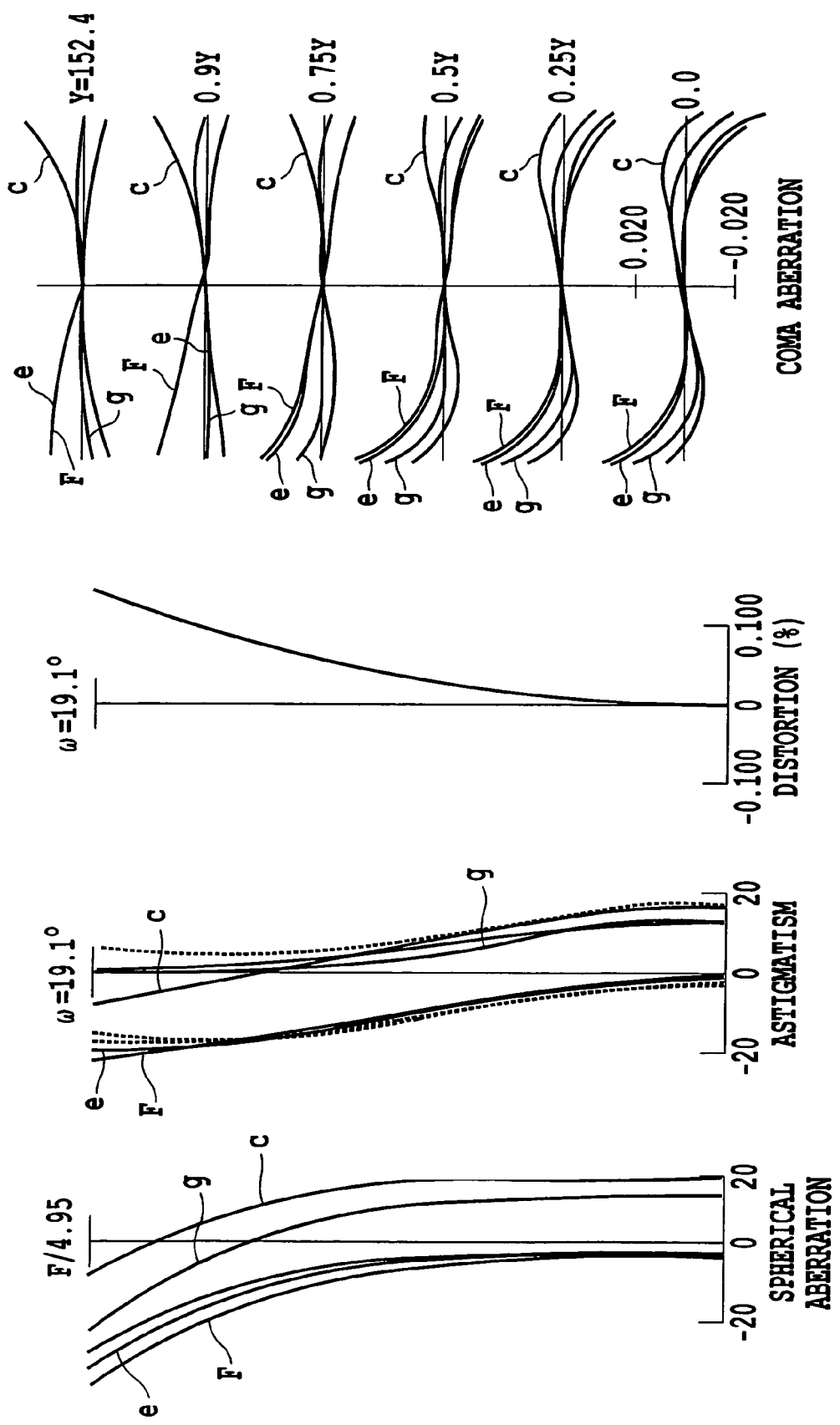
FIG. 2 shows the aberrations according to the first embodiment.

FIG. 2 is the aberrations according to the first embodiment. In the aberrations, e represents e line (546.07 nm), g represents g line (436.83 nm), c represents c line (656.27 nm), and F represents F line (486.13 nm). In the spherical aberration, the wavy lines illustrate the sine condition. In the astigmatism, the solid lines represent the sagittal rays, and the dotted lines represent the meridional rays. These are the same for the following embodiments 2 to 6.

(Second Embodiment)

f=90.289, F=4.68, m=0.23622, Y=152.4, ω=17.9°

Table 4 shows the data of the second embodiment by following the first embodiment.

TABLE 4

| | r | d | Nd | vd | ne | ng | nF | NC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ | | | | | | | | |
| 1 | 28.225 | 5.290 | 1.71300 | 53.94 | 1.71615 | 1.72939 | 1.72220 | 1.70898 | LAC8 (H) |
| 2 | 54.095 | 0.100 | | | | | | | |
| 3 | 25.730 | 7.740 | 1.72342 | 37.99 | 1.72793 | 1.74793 | 1.73685 | 1.71781 | BAFD8 (H) |
| 4 | 0.000 | 1.800 | 1.67270 | 32.17 | 1.67764 | 1.69999 | 1.68752 | 1.66661 | EFD5 (H) |
| 5 | 14.115 | 9.870 | | | | | | | |
| 6 | ∞ | 5.290 | | | | | | | |
| 7 | −40.735 | 2.370 | 1.68893 | 31.08 | 1.69417 | 1.71793 | 1.70466 | 1.68249 | LTIM28 (O) |
| 8 | −124.390 | 7.940 | | | | | | | |
| 9 | −111.887 | 10.670 | 1.48749 | 70.44 | 1.48914 | 1.49594 | 1.49227 | 1.48535 | FC5 (H) |
| 10 | −21.225 | | | | | | | | |
| C3 | ∞ | 1.000 | 1.51633 | 64.1 | 1.51825 | 1.52621 | 1.52191 | 1.51386 | SBSL7 (O) |
| C4 | ∞ | | | | | | | | |

Table 5 shows the aspherical coefficients.

TABLE 5

| Plain number | K | A4 | A6 | A8 | A10 |
|---|---|---|---|---|---|
| 7 | 10.0358 | 1.68617E−06 | 3.08889E−08 | −1.82958E−12 | 2.65356E−12 |

Table 6 represents $\delta\theta$ gfi (i=1 to 5) of the partial dispersion deviation of each lens and the parameter value of the condition (1).

TABLE 6

| $\delta\theta$ gd 1 | $\delta\theta$ gd 2 | $\delta\theta$ gd 3 | $\delta\theta$ gd 4 | $\delta\theta$ gd 5 | $\delta\theta$ gd(⊓) | $\delta\theta$ gd(⊔) | $\delta\theta$ gd(⊓) − $\delta\theta$ gd(⊔) |
|---|---|---|---|---|---|---|---|
| −0.00942 | 0.00190 | 0.00652 | 0.00700 | 0.00933 | 0.00060 | 0.00676 | −0.00616 |

Figure 3:
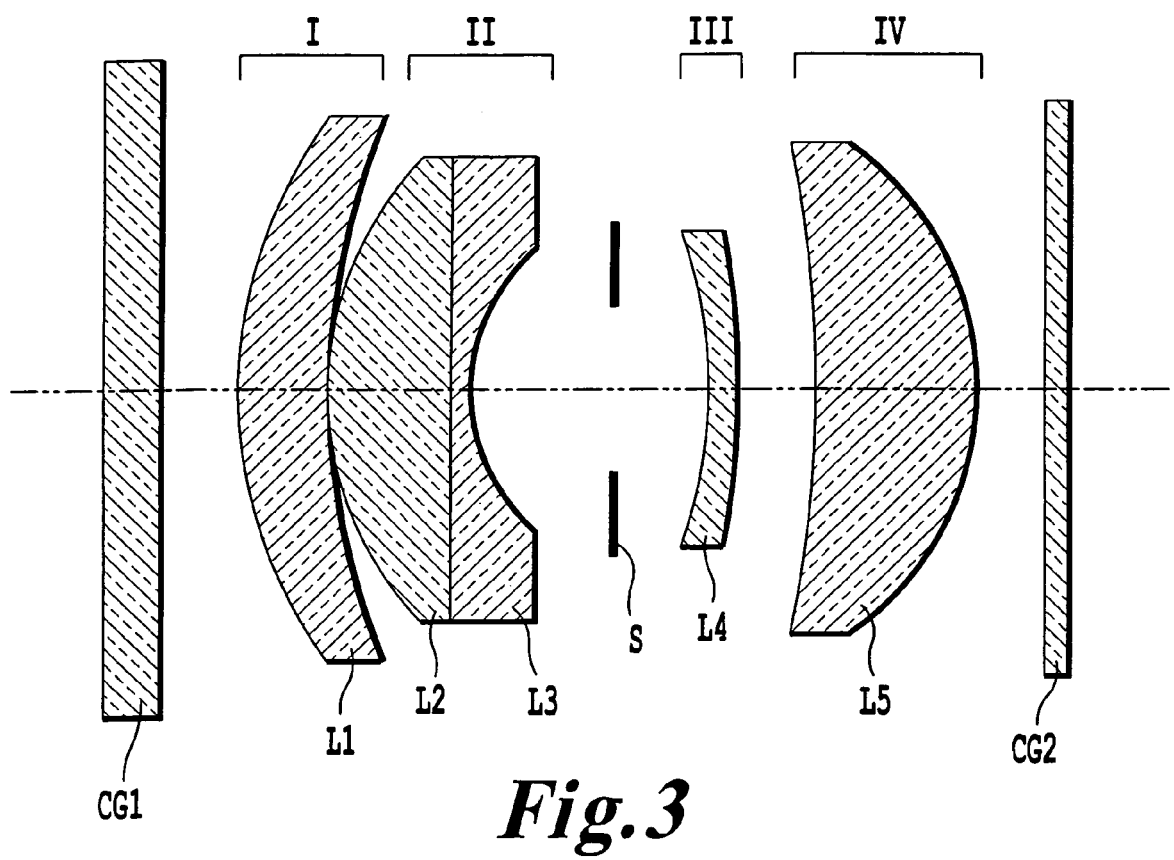
FIG. 3 is a view illustrating the lens construction of the second embodiment.

FIG. 3 shows the lens structure of the second embodiment.

Figure 4:
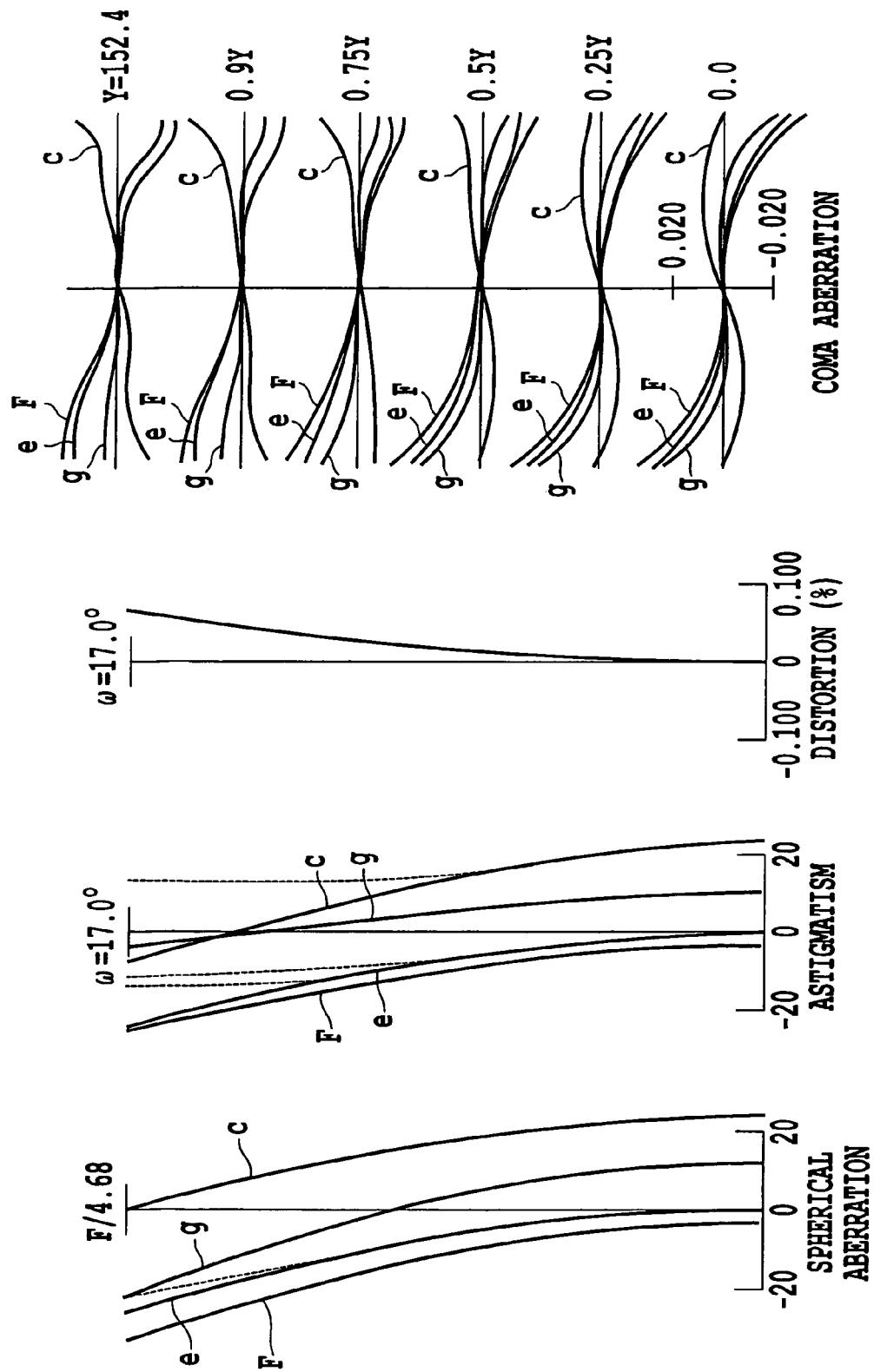
FIG. 4 shows the aberrations according to the second embodiment.

FIG. 4 is the aberrations according to the second embodiment.

(Third Embodiment)

f=70.530, F=4.50, m=0.16535, Y=152.4, ω=17.0°

Table 7 shows the data of the third embodiment by following the first embodiment.

Figure 5:
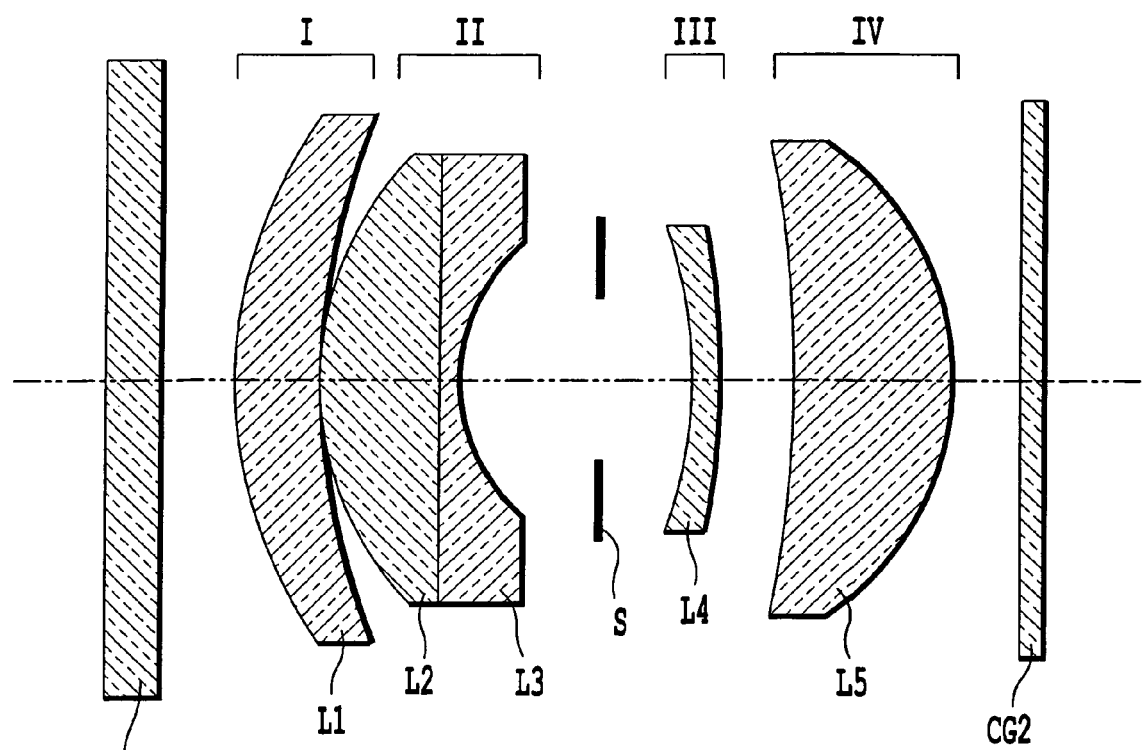
FIG. 5 is a view illustrating the lens construction of the third embodiment.

FIG. 5 illustrates the lens construction of the third embodiment.

Figure 6:
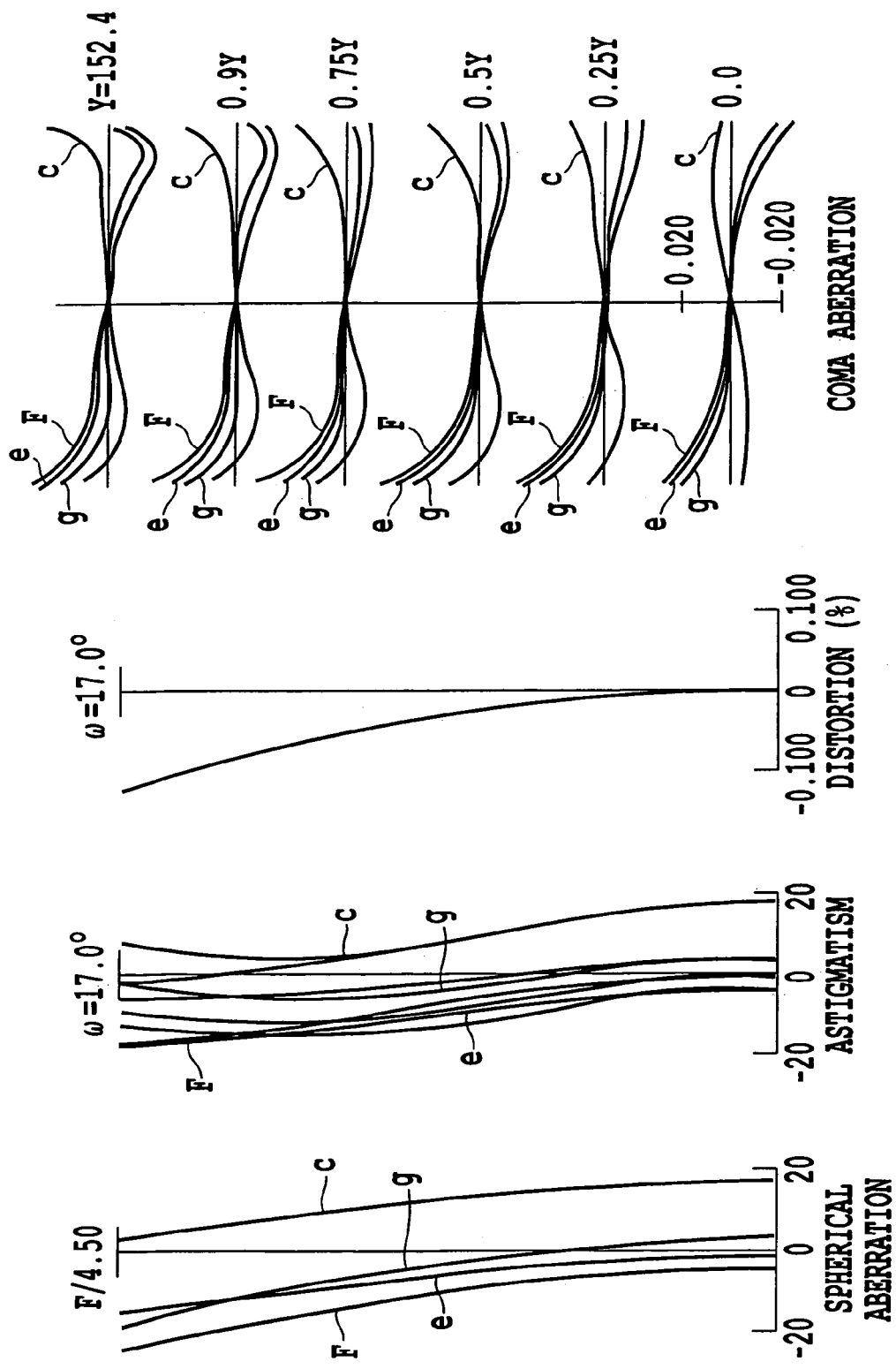
FIG. 6 shows the aberrations according to the third embodiment.

FIG. 6 shows the aberrations according to the third embodiment.

(Fourth Embodiment)

f=44.766, F=4.49, m=0.11102, Y=152.4, ω=18.8°

Table 10 shows the data of the fourth embodiment by following the first embodiment.

TABLE 7

| | R | d | nd | vd | Ne | Ng | nF | nC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ | | | | | | | | |
| 1 | 27.421 | 3.530 | 1.71300 | 53.94 | 1.71615 | 1.72939 | 1.72220 | 1.70898 | LAC8 (H) |
| 2 | 57.289 | 0.100 | | | | | | | |
| 3 | 20.177 | 6.098 | 1.72342 | 37.99 | 1.72793 | 1.74793 | 1.73685 | 1.71781 | BAFD8 (H) |
| 4 | −529.871 | 2.379 | 1.67270 | 32.17 | 1.67764 | 1.69999 | 1.68752 | 1.66661 | EFD5 (H) |
| 5 | 11.167 | 7.489 | | | | | | | |
| 6 | ∞ | 5.192 | | | | | | | |
| 7 | −29.079 | 4.104 | 1.68893 | 31.16 | 1.69416 | 1.71786 | 1.70462 | 1.68251 | EFD8 (H) |
| 8 | −69.839 | 5.034 | | | | | | | |
| 9 | −249.523 | 7.500 | 1.48749 | 70.44 | 1.48914 | 1.49594 | 1.49227 | 1.48535 | FC5 (H) |
| 10 | −18.375 | | | | | | | | |
| C3 | ∞ | 1.000 | 1.51633 | 64.1 | 1.51825 | 1.52621 | 1.52191 | 1.51386 | SBSL7 (O) |
| C4 | ∞ | | | | | | | | |

Table 8 shows the aspherical coefficients.

TABLE 8

| Plain number | K | A4 | A6 | A8 | A10 |
|---|---|---|---|---|---|
| 8 | −8.0883 | 1.02524E−05 | 4.83573E−08 | −4.51561E−10 | 2.09909E−12 |

Table 9 shows $\delta\theta$ gfi (i=1 to 5) of the partial dispersion deviation of each lens and the parameter value of condition (1).

TABLE 9

| $\Delta\theta$ gd 1 | $\delta\theta$ gd 2 | $\delta\theta$ gd 3 | $\delta\theta$ gd 4 | $\delta\theta$ gd 5 | $\delta\theta$ gd(⊓) | $\delta\theta$ gd(⊔) | $\delta\theta$ gd(⊓) − $\delta\theta$ gd(⊔) |
|---|---|---|---|---|---|---|---|
| −0.00942 | 0.00190 | 0.00652 | 0.00757 | 0.00933 | 0.00060 | 0.00704 | −0.00644 |

TABLE 10

| | R | D | nd | vd | ne | ng | nF | nC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ | | | | | | | | |
| 1 | 20.435 | 3.562 | 1.71300 | 53.94 | 1.71615 | 1.72939 | 1.72220 | 1.70898 | LAC8 (H) |
| 2 | 40.316 | 0.100 | | | | | | | |
| 3 | 14.853 | 5.141 | 1.72342 | 37.99 | 1.72793 | 1.74793 | 1.73685 | 1.71781 | BAFD8 (H) |
| 4 | −112.443 | 1.500 | 1.67270 | 32.17 | 1.67764 | 1.69999 | 1.68752 | 1.66661 | EFD5 (H) |
| 5 | 7.634 | 4.605 | | | | | | | |
| 6 | ∞ | 3.024 | | | | | | | |
| 7 | −21.272 | 1.129 | 1.68893 | 31.08 | 1.69417 | 1.71793 | 1.70466 | 1.68249 | LTIM28 (O) |
| 8 | −56.656 | 1.736 | | | | | | | |
| 9 | −100.039 | 6.817 | 1.48749 | 70.44 | 1.48914 | 1.49594 | 1.49227 | 1.48535 | FC5 (H) |
| 10 | −10.319 | | | | | | | | |
| C3 | ∞ | 1.000 | 1.51633 | 64.1 | 1.51825 | 1.52621 | 1.52191 | 1.51386 | SBSL7 (O) |
| C4 | ∞ | | | | | | | | |

Table 11 represents the aspherical coefficients.

TABLE 11

| Plain number | K | A4 | A6 | A8 | A10 |
|---|---|---|---|---|---|
| 7 | 9.66508 | 1.21655E−05 | 1.98194E−07 | 1.25400E−08 | 6.51065E−10 |

Table 12 shows $\delta \theta gfi$ (i=1 to 5) of the partial dispersion deviation of each lens and the parameter value of the condition (1).

TABLE 12

| $\delta \theta gd\ 1$ | $\delta \theta gd\ 2$ | $\delta \theta gd\ 3$ | $\delta \theta gd\ 4$ | $\delta \theta gd\ 5$ | $\delta \theta gd(⊓)$ | $\delta \theta gd(⊔)$ | $\delta \theta gd(⊓) - \delta \theta gd(⊔)$ |
|---|---|---|---|---|---|---|---|
| −0.00942 | 0.00190 | 0.00652 | 0.00700 | 0.00933 | 0.00060 | 0.00676 | −0.00616 |

Figure 7:
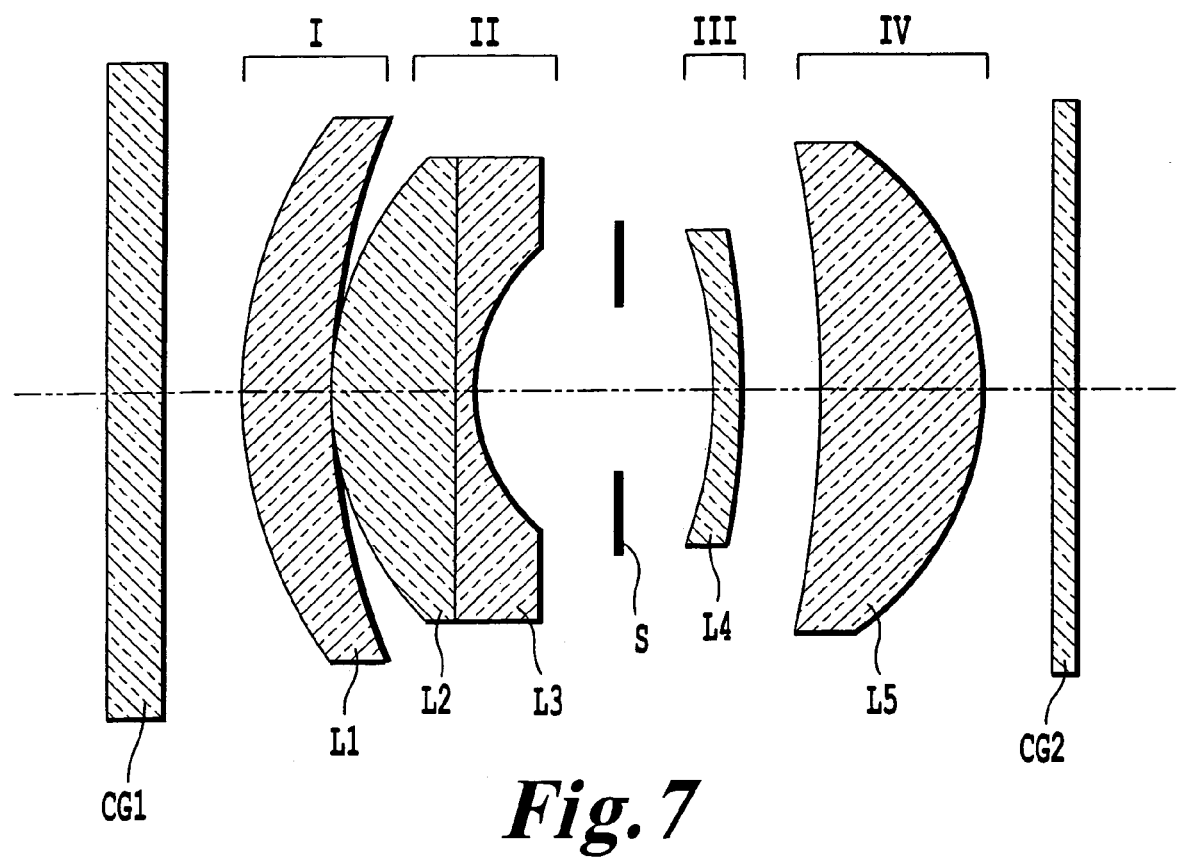
FIG. 7 is a view illustrating the lens construction of the fourth embodiment.

FIG. 7 illustrates the lens construction of the fourth embodiment.

Figure 8:
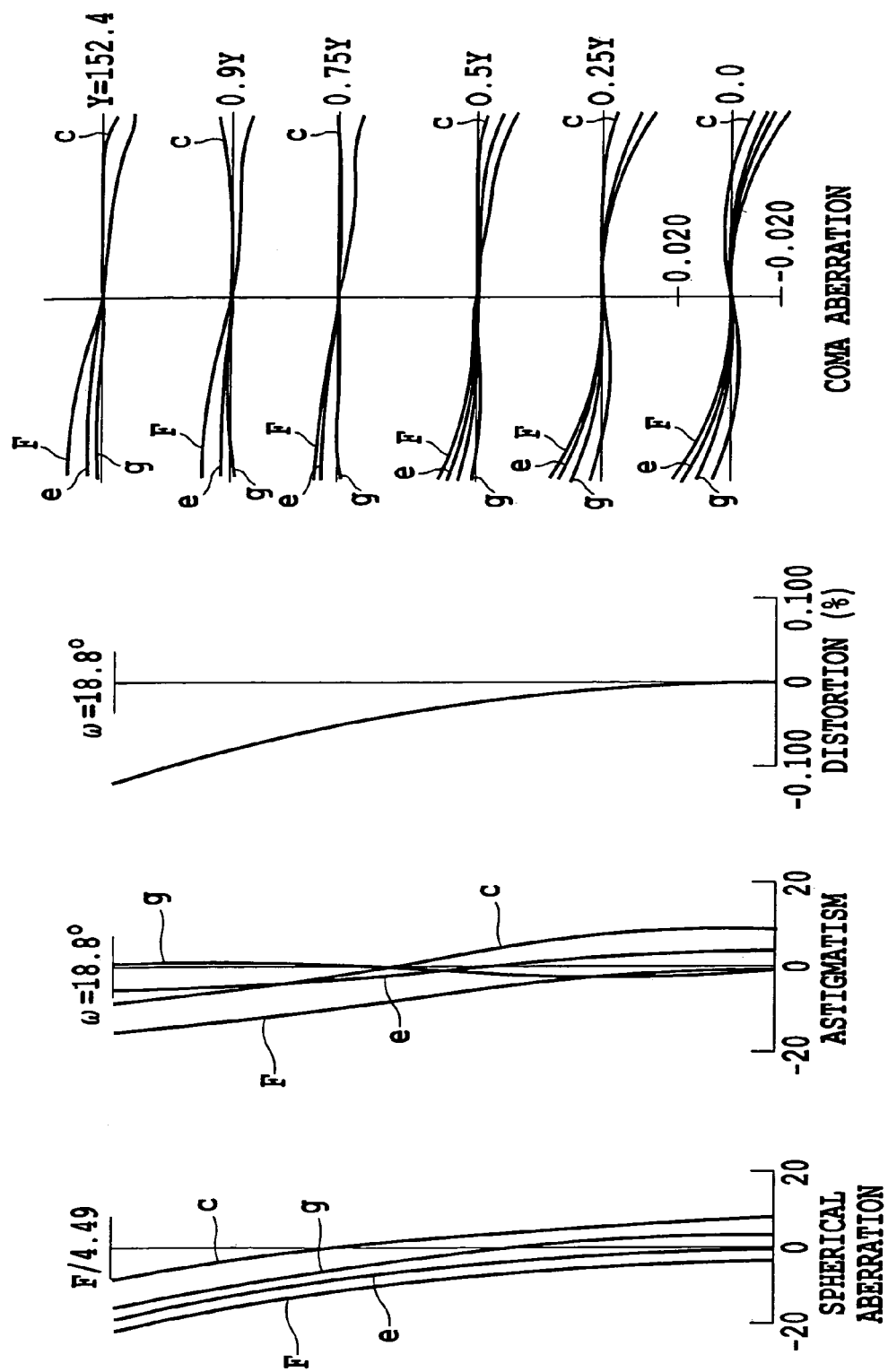
FIG. 8 shows the aberrations according to the fourth embodiment.

FIG. 8 shows the aberrations according to the fourth embodiment.

(Fifth Embodiment)

f=45.466, F=4.50, m=0.11102, Y=152.4, ω=18.5°

Table 13 shows the data of the fifth embodiment by following the first embodiment.

TABLE 13

| | R | D | Nd | vd | ne | ng | nF | NC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ | | | | | | | | |
| 1 | 17.260 | 5.500 | 1.51823 | 58.96 | 1.52033 | 1.52913 | 1.52435 | 1.51556 | EC3 (H) |
| 2 | 53.450 | 0.280 | | | | | | | |
| 3 | 12.050 | 4.530 | 1.72342 | 37.99 | 1.72793 | 1.74793 | 1.73685 | 1.71781 | BAFD8 (H) |
| 4 | 27.000 | 1.500 | 1.74077 | 27.76 | 1.74707 | 1.77597 | 1.75976 | 1.73307 | EFD13 (H) |
| 5 | 7.010 | 4.780 | | | | | | | |
| 6 | ∞ | 3.040 | | | | | | | |
| 7 | −20.700 | 2.200 | 1.68893 | 31.08 | 1.69417 | 1.71793 | 1.70466 | 1.68249 | LTIM28 (O) |
| 8 | −60.000 | 2.110 | | | | | | | |
| 9 | −71.350 | 6.460 | 1.51680 | 64.2 | 1.51872 | 1.52667 | 1.52237 | 1.51432 | BSC7 (H) |
| 10 | −10.710 | | | | | | | | |
| C3 | ∞ | 1.000 | 1.51633 | 64.1 | 1.51825 | 1.52621 | 1.52191 | 1.51386 | SBSL7 (O) |
| C4 | ∞ | | | | | | | | |

Table 14 shows the aspherical coefficients.

TABLE 14

| Plain number | K | A4 | A6 | A8 | A10 |
|---|---|---|---|---|---|
| 7 | 8.55340 | −5.26167E−06 | −6.52563E−07 | 4.18597E−08 | −6.36752E−10 |

Table 15 shows δ θ gfi (i=1 to 5) of the partial dispersion deviation of each lens and the parameter value of condition (1).

TABLE 15

| Δ θ gd 1 | δ θ gd 2 | δ θ gd 3 | δ θ gd 4 | Δ θ gd 5 | δ θ gd(⊓) | δ θ gd(⊔) | δ θ gd(⊓) − δ θ gd(⊔) |
|---|---|---|---|---|---|---|---|
| 0.00223 | 0.00190 | 0.01024 | 0.00700 | 0.00016 | 0.00143 | 0.00862 | −0.00719 |

Figure 9:
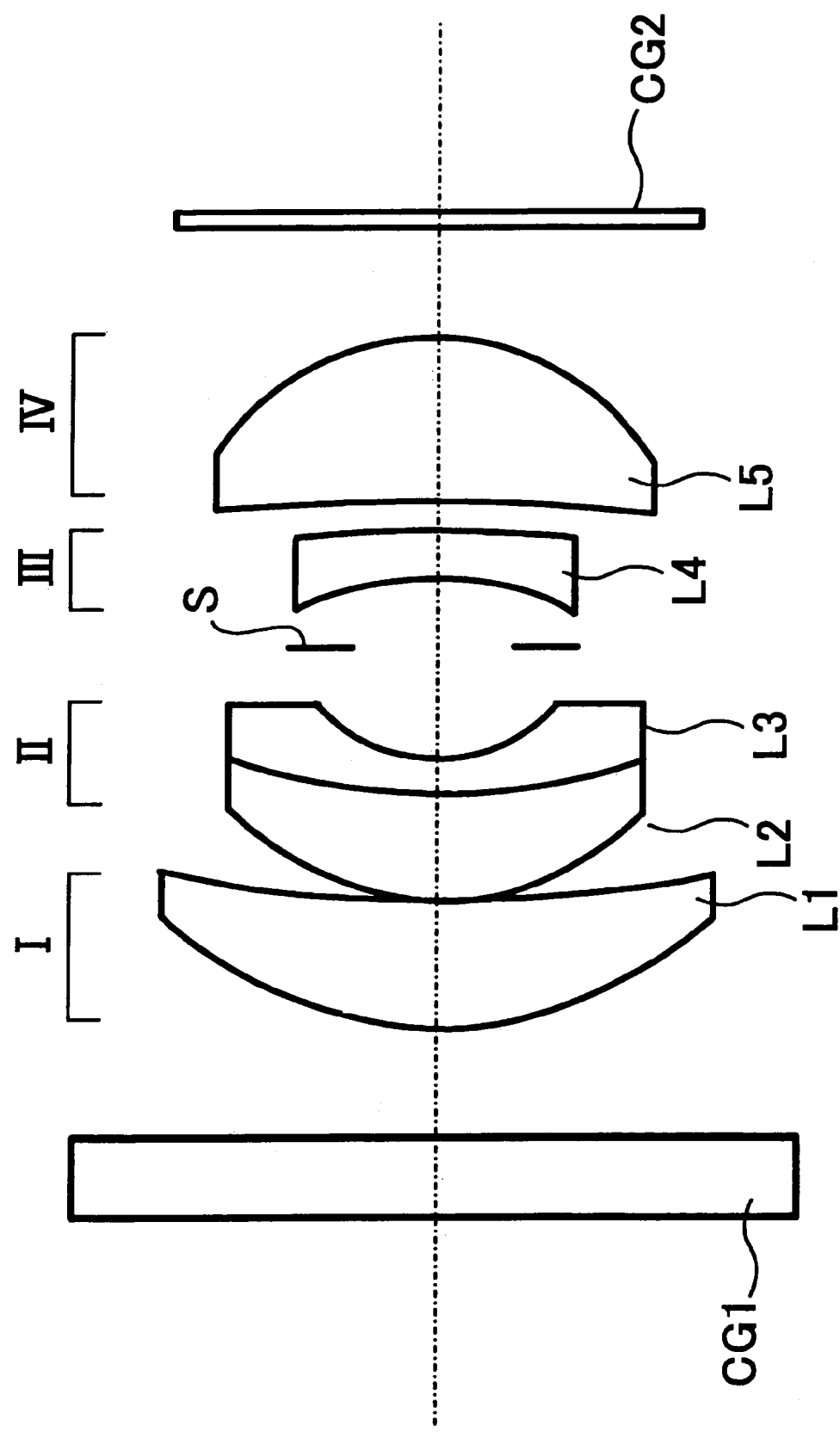
FIG. 9 is a view illustrating the lens construction of the fifth embodiment.

FIG. 9 illustrates the lens construction of the fifth embodiment.

Figure 10:
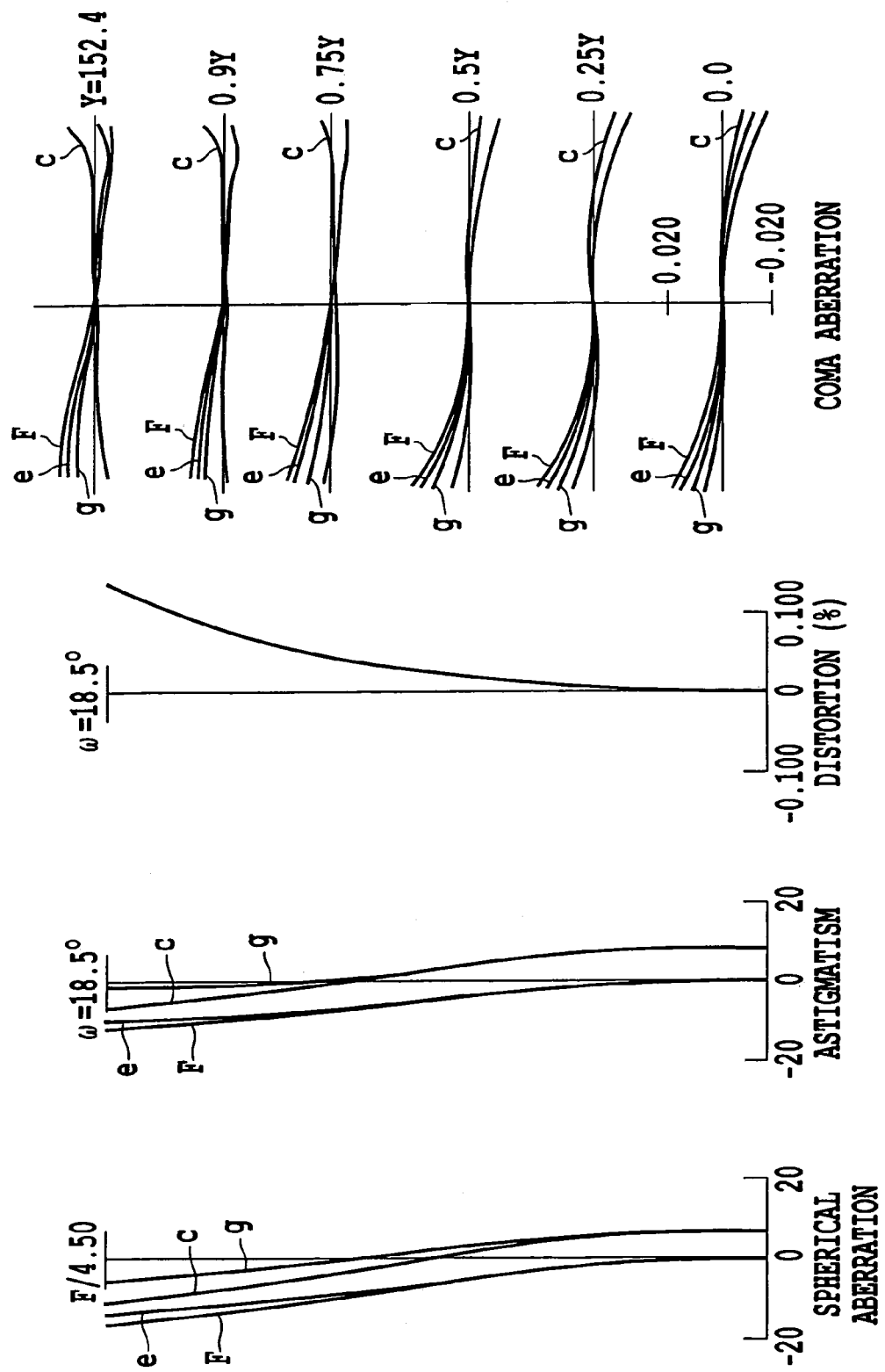
FIG. 10 shows the aberrations according to the fifth embodiment.

FIG. 10 shows aberrations according to the fifth embodiment.

(Sixth Embodiment)

f=45.321, F=4.49, m=0.11102, Y=152.4, ω=18.6°

Table 16 shows the data of the sixth embodiment by following the first embodiment.

Figure 11:
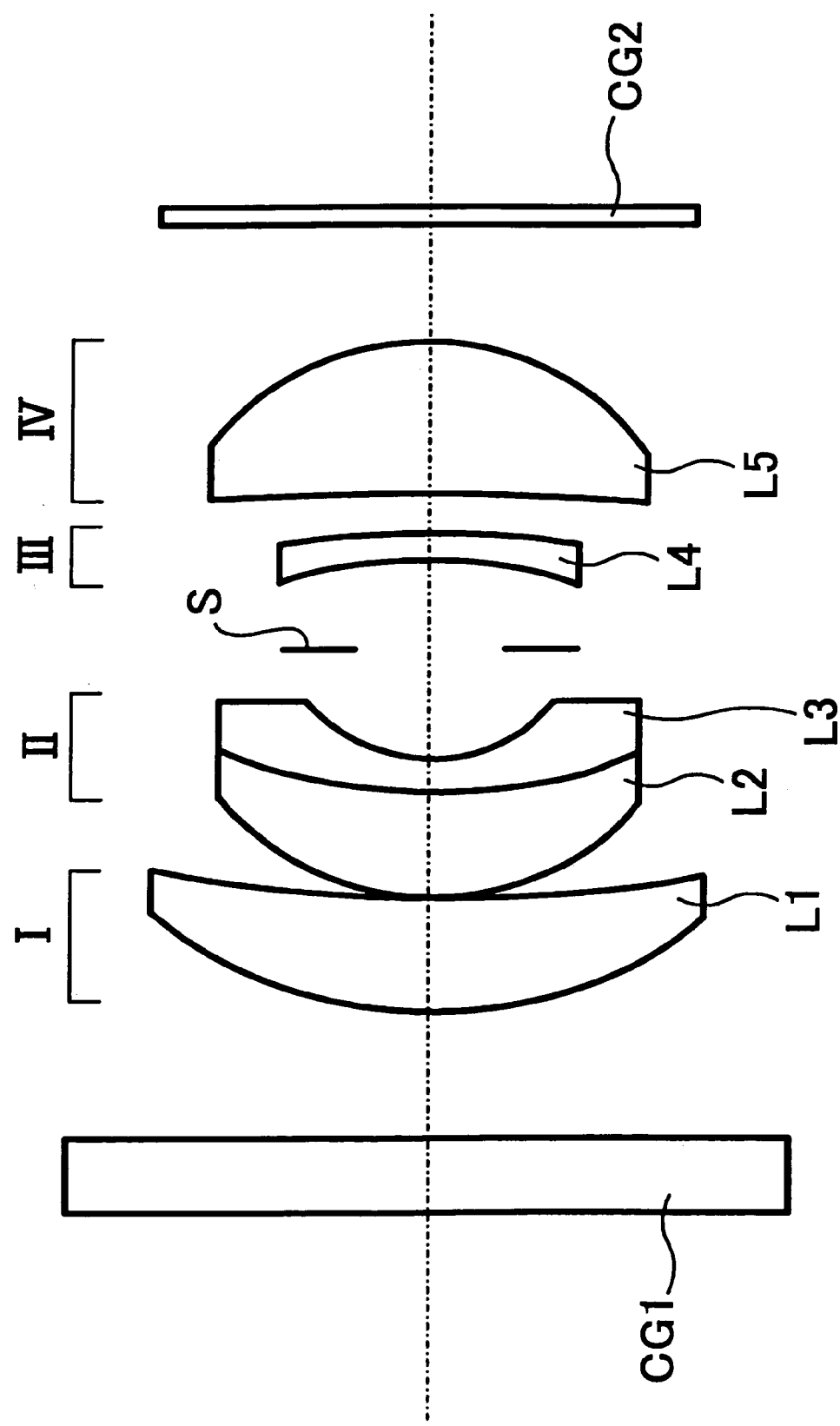
FIG. 11 is a view illustrating the lens construction of the sixth embodiment.

FIG. 11 illustrates the lens construction of the sixth embodiment.

Figure 12:
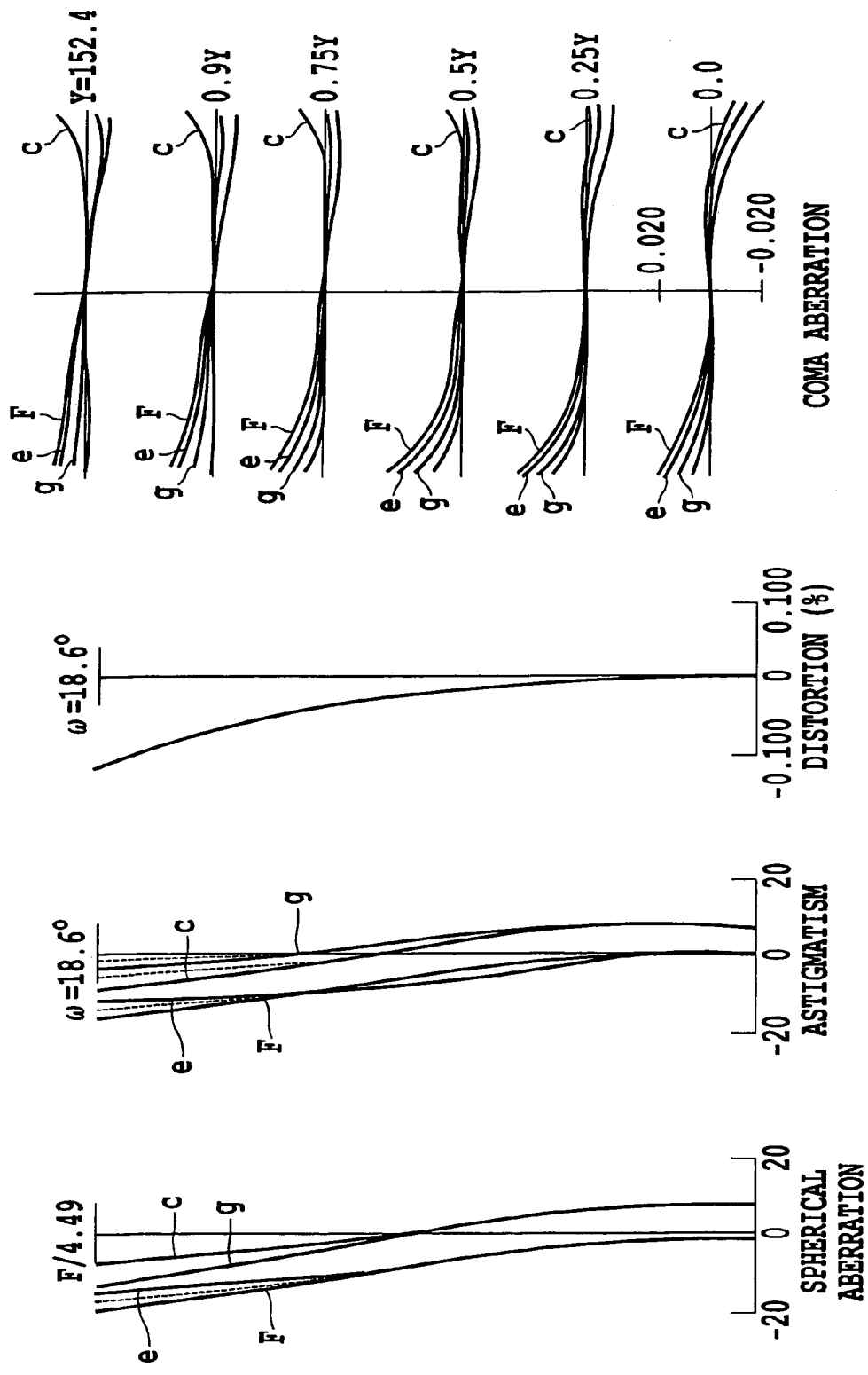
FIG. 12 shows the aberrations according to the sixth embodiment.

FIG. 12 shows the aberrations according to the sixth embodiment.

Table 19 shows the combined focal length with respect to e line of the entire system f, the focal length with respect to e line of the first group f1, the combined focal length with respect to e line of the second and third groups f 23, the distance on the optical axis from

TABLE 16

|  | R | D | nd | vd | Ne | ng | nF | nC | Material name |
|---|---|---|---|---|---|---|---|---|---|
| C1 | ∞ | 3.200 | 1.51633 | 64.1 | 1.51825 | 1.52621 | 1.52191 | 1.51386 | SBSL7 (O) |
| C2 | ∞ |  |  |  |  |  |  |  |  |
| 1 | 18.350 | 4.810 | 1.51823 | 58.96 | 1.52033 | 1.52913 | 1.52435 | 1.51556 | EC3 (H) |
| 2 | 58.600 | 0.100 |  |  |  |  |  |  |  |
| 3 | 11.390 | 4.400 | 1.72342 | 37.99 | 1.72793 | 1.74793 | 1.73685 | 1.71781 | BAFD8 (H) |
| 4 | 22.080 | 1.500 | 1.74077 | 27.76 | 1.74707 | 1.77597 | 1.75976 | 1.73307 | EFD13 (H) |
| 5 | 6.630 | 4.770 |  |  |  |  |  |  |  |
| 6 | ∞ | 3.980 |  |  |  |  |  |  |  |
| 7 | −19.400 | 1.080 | 1.68893 | 31.16 | 1.69415 | 1.71798 | 1.70463 | 1.68252 | MFD80 (H) |
| 8 | −42.780 | 1.760 |  |  |  |  |  |  |  |
| 9 | −139.000 | 6.480 | 1.51680 | 64.2 | 1.51872 | 1.52667 | 1.52237 | 1.51432 | BSC7 (H) |
| 11 | −11.300 |  |  |  |  |  |  |  |  |
| C3 | ∞ | 1.000 | 1.51633 | 64.1 | 1.51825 | 1.52621 | 1.52191 | 1.51386 | SBSL7 (O) |
| C4 | ∞ |  |  |  |  |  |  |  |  |

Table 17 shows the aspherical coefficients.

TABLE 17

| Plain number | K | A4 | A6 | A8 | A10 |
|---|---|---|---|---|---|
| 8 | −25.56561 | 9.06106E−06 | 7.22264E−07 | −9.79896E−09 | 8.48917E−11 |

Table 18 shows δ θ gfi (i=1 to 5) of the partial dispersion deviation of each lens and the parameter value of the condition (1).

the aperture stop to the fourth lens d 6, and the value of each parameter in the conditions (2) to (4) in the first to sixth embodiments.

TABLE 18

| Δ θ gd 1 | δ θ gd 2 | δ θ gd 3 | δ θ gd 4 | δ θ gd 5 | δ θ gd(⊓) | δ θ gd(⊔) | δ θ gd(⊓) − δ θ gd(⊔) |
|---|---|---|---|---|---|---|---|
| 0.00223 | 0.00190 | 0.01024 | 0.01300 | 0.00016 | 0.00143 | 0.01162 | −0.01019 |

TABLE 19

| Embodiment | f | f 1 | f 23 | d 6 | f 1/f | f 23/f | d 6/f |
|---|---|---|---|---|---|---|---|
| 1 | 84.258 | 78.060 | −40.667 | 5.980 | 0.926 | −0.482 | 0.071 |
| 2 | 90.289 | 75.933 | −42.155 | 5.290 | 0.841 | −0.467 | 0.059 |
| 3 | 70.530 | 69.988 | −37.529 | 5.192 | 0.992 | −0.532 | 0.074 |
| 4 | 44.766 | 53.839 | −23.767 | 3.024 | 1.203 | −0.531 | 0.068 |
| 5 | 45.466 | 46.569 | −22.949 | 3.040 | 1.024 | −0.505 | 0.067 |
| 6 | 45.321 | 49.326 | −23.727 | 3.980 | 1.088 | −0.524 | 0.088 |

As described above, according to the present invention, the small and low-cost original reading lens which is preferable for reading a full-color image can be provided. Even though the original reading lens of the present invention has a four-group, five-element lens configuration in which the number of the lenses is less than the Gauss type of six-element lens configuration, such an original reading lens is constructed such that the F/No is bright about 4.4 to 4.5, the vignetting factor is substantially 100% up to the peripheral part, the curvature of field is well corrected, the coma flare is small, the contrast is high from the vicinity of the axis to the peripheral part in the high spatial frequency region area, the axis chromatic aberration is well corrected and its secondary spectrum is reduced, and the deference of imaging positions of each color light such as red, green, and blue is small.

Moreover, the original reading device using such an original reading lens can favorably read the color image of original. The image forming device using such an original reading device can provide a preferable image formation based on the preferably red color image information.

In the original reading lens of the present invention, the glass material of the lens can be recycled, and does not cause the water pollution by the wastewater at the time of processing.

What is claimed is:

1. An original reading lens, comprising:
a four-group, five-element lens configuration including three positive lenses and two negative lenses, wherein
the positive lenses comprise a glass material of low dispersion, and the negative lenses comprise a glass material of high dispersion,
a partial dispersion qgd is defined by the equation qgd=(ng−nd)/(nF−nc) by a refractive index of d line (587.56 nm) nd, a refractive index of c line (656.27 nm) nc, a refractive index of F line (486.13 nm) nF, and a refractive index of g line (435.83 nm) ng,
a straight line connecting a coordinate point of a reference glass material K7, K7 (qgd, vd) and a coordinate point of a reference glass material F2, F2 (qgd, vd) on a plane with a coordinate system including the partial dispersion qgd and an Abbe number vd as two orthogonal axes is adopted as a reference line, and
a partial dispersion deviation, δqgd which is the deviation from the reference line of the partial dispersion qgd of the material, is positive in one or more positive lens.

2. The original reading lens according to claim 1, wherein the five lenses comprise glass material, and the glass material does not contain lead or arsenic.

3. An original reading lens unit, comprising the original reading lens described in claim 1, which is integrally incorporated into a lens barrel.

4. An original reading device configured to read a color image on an original media with a full range of colors, comprising:
an original supporting device configured to support the original;
an illumination device configured to illuminate the original media supported by the original supporting device;
an original reading lens configured to image an image of the illuminated original;
a color separation device disposed on an imaging optical path of an original reading lens; and
an imaging device to receive an image imaged by the original reading lens and convert the image into an electronic signal, wherein
the original reading lens according claim 1 is used as the original reading lens.

5. An image forming device configured to form an image by writing an image corresponding to an image signal, comprising the original reading device according to claim 4 as a device to convert the image into a signal by reading the original image with full range of colors.

6. The image forming device according to claim 5, wherein the writing of the image corresponding to the image signal is carried out by an optical writing.

7. The image forming device according to claim 6, wherein an electrostatic latent image corresponding to an image to be formed is formed onto a photoconductive photoconductor by the optical writing.

8. An original reading lens, comprising:
a four-group, five-element lens configuration including three positive lenses and two negative lenses;
the four-group, five-element lens configuration including, in order from an object side, a first group having a first lens, a second group in which a second lens and a third lens are cemented, a third group having a fourth lens, and a fourth group having a fifth lens, and an aperture stop disposed between the second group and the third group, wherein
the positive lenses comprise a glass material of low dispersion, and the negative lens comprises a glass material of high dispersion,
a partial dispersion qgd is defined by qgd=(ng−nd)/(nF−nc) by a refractive index of d line (587.56 nm) nd, a refractive index of c line (656.27 nm) nc, a refractive index of F line (486.13 nm) nF, and a refractive index of g line (435.83 nm) ng,
a straight line connecting a coordinate point of a reference glass material K7, K7 (qgd, vd) and a coordinate point of a reference glass material F2, F2 (qgd, vd) on a plane with a coordinate system including the partial dispersion qgd and an Abbe number vd as two orthogonal axes is adopted as a reference line, and
a partial dispersion deviation δqgd which is a deviation from the reference line of the partial dispersion qgd of a material of a positive lens is positive in one or more positive lens.

9. The original reading lens according to claim 8, wherein the partial dispersion deviation δqgd is positive at least in two positive lenses,
an average value of the partial dispersion deviation of the three positive lenses δqgd (convex) and an average value of the partial dispersion deviation of the two negative lenses δqgd (concave) satisfy a following condition (1), $$-0.011 < \delta qgd(\text{convex}) - \delta qgd(\text{concave}) < -0.005, \text{ and} \tag{1}$$

at least one surface of the fourth lens includes an aspherical surface.

10. The original reading lens according to claim 9, wherein
the partial dispersion deviation δqgd of the three positive lenses is positive, and
the average value of the partial dispersion deviation of the three positive lenses δqgd (convex) and the average value of the partial dispersion deviation of the two negative lenses δqgd (concave) satisfy a following condition (1A), $$-0.011 < \delta qgd(\text{convex}) - \delta qgd(\text{concave}) < -0.007. \quad (1A)$$

11. The original reading lens according to claim 10, wherein
a combined focal length with respect to e line of an entire system f, a focal length with respect to e line of the first group f1, and a combined focal length with respect to e line of the second group and the third group f23 satisfy following conditions (2), (3), $$0.77 < f1/f < 1.28 \quad (2)$$

$$-0.55 < f23/f < -0.45. \quad (3)$$

12. The original reading lens according to claim 11, wherein the combined focal length with respect to e line of the entire system f and a distance on an optical axis from the aperture stop to the fourth lens d6 satisfy a following condition (4), $$0.05 < d6/f < 0.09. \quad (4)$$

13. The original reading lens according to claim 10, wherein a combined focal length with respect to e line of an entire system f and a distance on an optical axis from the aperture stop to the fourth lens d6 satisfy a following condition (4), $$0.05 < d6/f < 0.09. \quad (4)$$

14. The original reading lens according to claim 9, wherein
a combined focal length with respect to e line of an entire system f, a focal length with respect to e line of the first group f1, and a combined focal length with respect to e line of the second group and the third group f23 satisfy the following conditions (2), (3), $$0.77 < f1/f < 1.28 \quad (2)$$

$$-0.55 < f23/f < -0.45. \quad (3)$$

15. The original reading lens according to claim 14, wherein the combined focal length with respect to e line of the entire system f and a distance on an optical axis from the aperture stop to the fourth lens d6 satisfy a following condition (4), $$0.05 < d6/f < 0.09. \quad (4)$$

16. The original reading lens according to claim 9, wherein a combined focal length with respect to e line of an entire system f and a distance on an optical axis from the aperture stop to the fourth lens d6 satisfy a following condition (4), $$0.05 < d6/f < 0.09. \quad (4)$$

17. The original reading device according to claim 16, wherein the original supporting device is a contact glass configured to receive the original planarly, the illumination device illuminates the original received by the contact glass in a slit shape and includes a device to scan the original in a direction orthogonal to the slit shaped illuminated portion, and the imaging device is a line sensor.

18. The original reading lens according to claim 8, wherein
a combined focal length with respect to e line of an entire system f, a focal length with respect to e line of the first group f1, and a combined focal length with respect to e line of the second group and the third group f23 satisfy the following conditions, $$0.77 < f1/f < 1.28 \quad (2)$$

$$-0.55 < f23/f < -0.45. \quad (3)$$

19. The original reading lens according to claim 18, wherein the combined focal length with respect to e line of the entire system f and a distance on an optical axis from the aperture stop to the fourth lens d6 satisfy a following condition (4), $$0.05 < d6/f < 0.09. \quad (4)$$

20. The original reading lens according to claim 8, wherein a combined focal length with respect to e line of an entire system f and a distance on an optical axis from the aperture stop to the fourth lens d6 satisfy a following condition (4), $$0.05 < d6f < 0.09. \quad (4)$$

21. The original reading lens according to claim 8, wherein the second lens group is a meniscus shape having a convex surface directed toward the object side, and the fourth lens is a meniscus shape having a convex surface directed toward an image surface.

22. The original reading lens according to claim 21, wherein the first lens is a meniscus lens having a convex surface directed toward the object side, and the fifth lens is a meniscus lens having a convex surface directed toward the image surface.

23. The original reading lens according to claim 21, wherein the aspherical surface of the fourth lens comprises a shape, such that a negative power increases toward the peripheral part.

* * * * *